US012450982B2

(12) United States Patent
Delekta et al.

(10) Patent No.: US 12,450,982 B2
(45) Date of Patent: *Oct. 21, 2025

(54) GAMING MACHINE AND METHODS FOR OPERATING GAMING MACHINES TO PROVIDE SKILL-BASED WAGERING GAMES TO PLAYERS

(71) Applicant: Konami Gaming, Inc., Las Vegas, NV (US)

(72) Inventors: Scott Delekta, Las Vegas, NV (US); Michael Kuhlmann, Las Vegas, NV (US); Satoshi Suda, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,171

(22) Filed: Mar. 10, 2023

(65) Prior Publication Data

US 2023/0290222 A1 Sep. 14, 2023

Related U.S. Application Data

(63) Continuation of application No. 16/940,005, filed on Jul. 27, 2020, now Pat. No. 11,640,749, which is a (Continued)

(51) Int. Cl.
*G07F 17/32* (2006.01)

(52) U.S. Cl.
CPC ...... *G07F 17/3267* (2013.01); *G07F 17/3209* (2013.01); *G07F 17/3211* (2013.01); (Continued)

(58) Field of Classification Search
CPC ............. G07F 17/3209; G07F 17/3211; G07F 17/3258; G07F 17/3262; G07F 17/3267; G07F 17/3295
See application file for complete search history.

(56) References Cited

U.S. PATENT DOCUMENTS 10,121,328 B2 * 11/2018 Hirai .................. G07F 17/3295
10,354,492 B2 * 7/2019 Nelson ................ G07F 17/3213
(Continued)

*Primary Examiner* — Kang Hu
*Assistant Examiner* — Jason Pinheiro
(74) *Attorney, Agent, or Firm* — Howard & Howard Attorneys PLLC

(57) ABSTRACT

A gaming machine for providing a skill-based wagering game to a player is described herein. The gaming machine includes a controller programmed to display the skill-based wagering game on a display device, receive a signal indicating a wager being received from the player, and initiate the skill-based wagering game. The controller determines a player skill level value associated with the player based on player skill operations received during game play and accesses RTP value data to determine an RTP value based on the determined player skill level value and the received wager amount. The controller generates a plurality of primary awards as a function of the determined RTP value, displays a primary award selection screen to select a primary award from the plurality of primary awards, and adjust the credit balance based on the player selected primary award.

15 Claims, 27 Drawing Sheets

Related U.S. Application Data continuation of application No. 15/694,000, filed on Sep. 1, 2017, now abandoned.

(60) Provisional application No. 62/383,314, filed on Sep. 2, 2016.

(52) U.S. Cl.
CPC ...... *G07F 17/3258* (2013.01); *G07F 17/3262* (2013.01); *G07F 17/3295* (2013.01)

(56) References Cited

U.S. PATENT DOCUMENTS

| | | | | |
|---|---|---|---|---|
| 2006/0030400 | A1 | 2/2006 | Mathis | |
| 2009/0061999 | A1 | 3/2009 | Popovich et al. | |
| 2011/0212766 | A1* | 9/2011 | Bowers | G07F 17/32<br>463/25 |
| 2012/0115579 | A1* | 5/2012 | Buecheler | G07F 17/3239<br>463/23 |
| 2013/0131848 | A1* | 5/2013 | Arnone | G07F 17/326<br>700/91 |
| 2013/0324222 | A1 | 12/2013 | De Viveiros Ortiz | |
| 2015/0348367 | A1* | 12/2015 | Arnone | G07F 17/3244<br>463/26 |
| 2016/0125697 | A1* | 5/2016 | Oberberger | G07F 17/3288<br>463/26 |

* cited by examiner

156

158 154 130

| Wager (Credits) | RTP Value | Primary Award Values (Credits) | | | | |
|---|---|---|---|---|---|---|
| 4 | 80% | 2 | 4 | 3 | 5 | 2 |
| 8 | 83% | 6 | 8 | 6 | 8 | BF |
| 8 | 84% | 6 | 9 | 4 | 10 | BF |
| 8 | 85% | 6 | 10 | 6 | 8 | BF |
| 8 | 87% | 8 | 9 | 10 | 8 | BF |
| 20 | 84% | 15 | 23 | 15 | BF | BF |
| 20 | 85% | 16 | 25 | 15 | BF | BF |
| 20 | 86% | 16 | 25 | 22 | BF | BF |
| 20 | 88% | 20 | 22 | 18 | BF | BF |

162

172 164 164

FIG. 15

198

| Wager | $1 | $2 | $5 |
|---|---|---|---|
| Credits | 4 | 8 | 20 |
| High Score Bonus Eligible | No | Yes | Yes |
| Wheel Bonus Chance | 0% | 20% | 40% |

FIG. 16

152

| Wager (Credits) 158 | Award Skill Level 132 | RTP Value 154 |
|---|---|---|
| 4 | 0, 1, 2, 3 | 80% |
| 8 | 0 | 83% |
| 8 | 1 | 84% |
| 8 | 2 | 85% |
| 8 | 3 | 87% |
| 20 | 0 | 84% |
| 20 | 1 | 85% |
| 20 | 2 | 86% |
| 20 | 3 | 88% |

FIG. 17

136

| Skill Level Value Range (106) | Award Skill Level (132) | |
|---|---|---|
| 0 – 165,999 | 0 | 142 |
| 166,000 – 299,999 | 1 | 144 |
| 300,000 – 499,999 | 2 | 146 |
| 500,000 – 1,000,000 | 3 | 148 |

FIG. 18

138

| Range (140) | % of Players (150) | Stars | |
|---|---|---|---|
| Bottom 50% | 50% | 0 | 142 |
| Top 50% | 25% | 1 | 144 |
| Top 25% | 15% | 2 | 146 |
| Top 10% | 10% | 3 | 148 |

FIG. 19

166

158 132 168

| Wager (Credits) | Award Skill Level | Progressive Award Probability | | | |
|---|---|---|---|---|---|
| | | MINI | MAJOR | MEGA | MAXI |
| 8 | 0 | 0.010 | 0.0022 | 0.00040 | 0.00010 |
| 8 | 1 | 0.020 | 0.0023 | 0.00041 | 0.00012 |
| 8 | 2 | 0.021 | 0.0050 | 0.00042 | 0.00015 |
| 8 | 3 | 0.022 | 0.0053 | 0.00080 | 0.00020 |
| 20 | 0 | 0.020 | 0.0043 | 0.00080 | 0.00020 |
| 20 | 1 | 0.040 | 0.0046 | 0.00083 | 0.00025 |
| 20 | 2 | 0.042 | 0.010 | 0.00085 | 0.00027 |
| 20 | 3 | 0.043 | 0.012 | 0.0010 | 0.00030 |

170

FIG. 20

114

106

116

| Player ID | Game Instance ID | Total Point Score | Date/Time |
|---|---|---|---|
| Player001 | Game001 | 15,020 | 12212016:13:01 |
| Player002 | Game020 | 325,000 | 12212016:14:20 |
| Player023 | Game302 | 152,235 | 12212016:14:22 |
| Player105 | game421 | 432,201 | 12222016:16:05 |

FIG. 21

108

| Skill Event | Score |
|---|---|
| Successfully jumping Frog forward to open position | +1 to 25 points |
| Eating a Fly | +5 points |
| Catching Lady Frog | +5 points |

FIG. 22

120

122

| Game Map | Selection Probability |
|---|---|
| Gamemap001.exe | 20% |
| Gamemap010.exe | 25% |
| Gamemap121.exe | 35% |

FIG. 23

178

| | Reset $ | Increment |
|---|---|---|
| MAXI | $ 5,000.00 | 0.05% |
| MEGA | $ 1,000.00 | 0.10% |
| MAJOR | $ 200.00 | 0.15% |
| MINI | $ 50.00 | 0.25% |
| Leaderboard | | 1.45% |
| Total Increment | | **2.00%** |

FIG. 24

180

Overall JP Cycle

| | Stars | | | | |
|---|---|---|---|---|---|
| Bet (Credits) | 0 | 1 | 2 | 3 | **Overall** |
| 4 | - | - | - | - | |
| 8 | 1000 | 600 | 500 | 425 | **631.25** |
| 20 | 500 | 250 | 200 | 180 | **282.50** |

FIG. 25

180

JP Cycle MINI

| | Stars | | | |
|---|---|---|---|---|
| Bet (Credits) | 0 | 1 | 2 | 3 |
| 8 | 1000 | 500 | 480 | 460 |
| 20 | 510 | 250 | 240 | 230 |

Strike Value MINI

| | Stars | | | |
|---|---|---|---|---|
| Bet (Credits) | 0 | 1 | 2 | 3 |
| 8 | $50 | $48 | $47 | $46 |
| 20 | $52 | $49 | $48.5 | $48 |

FIG. 26

180

JP Cycle MAJOR

| | Stars | | | |
|---|---|---|---|---|
| Bet (Credits) | 0 | 1 | 2 | 3 |
| 8 | 4,500 | 4,300 | 2,000 | 1,900 |
| 20 | 2,300 | 2,150 | 1,000 | 900 |

Strike Value MAJOR

| | Stars | | | |
|---|---|---|---|---|
| Bet (Credits) | 0 | 1 | 2 | 3 |
| 8 | $200 | $198 | $190 | $188 |
| 20 | $202 | $200 | $192 | $190 |

FIG. 27

180

JP Cycle MEGA

| | Stars | | | |
|---|---|---|---|---|
| Bet (Credits) | 0 | 1 | 2 | 3 |
| 8 | 25,000 | 24,800 | 24,500 | 12,000 |
| 20 | 12,500 | 12,400 | 12,000 | 6,100 |

Strike Value MEGA

| | Stars | | | |
|---|---|---|---|---|
| Bet (Credits) | 0 | 1 | 2 | 3 |
| 8 | $1,100 | $1,090 | $1,080 | $1,050 |
| 20 | $1,150 | $1,100 | $1,090 | $1,055 |

FIG. 28

180

JP Cycle MAXI

| | Stars | | | |
|---|---|---|---|---|
| Bet (Credits) | 0 | 1 | 2 | 3 |
| 8 | 120000 | 115000 | 110000 | 105000 |
| 20 | 62000 | 55000 | 52500 | 51000 |

Strike Value MAXI

| | Stars | | | |
|---|---|---|---|---|
| Bet (Credits) | 0 | 1 | 2 | 3 |
| 8 | $5,000 | $4,900 | $4,850 | $4,800 |
| 20 | $5,050 | $5,000 | $4,950 | $4,900 |

FIG. 29

186

184 194

| | Leaderboard Prize Level | Threshold Range | Prob* | Per 2000 games | % of pool |
|---|---|---|---|---|---|
| 188 | 1 | Top 1% | 0.05% | 1 | 50% |
| 190 | 2 | Top 2% | 0.15% | 3 | 30% |
| 192 | 3 | Top 3% | 0.30% | 6 | 20% |

*Probability is an estimate based on the recorded gameplay used to set the threshold.

FIG. 30

186

106 184

| | Score to Beat | Prize | % of Total Available Prize |
|---|---|---|---|
| 188 | 986 | $ 490.00 | 70% |
| 190 | 912 | $ 140.00 | 20% |
| 192 | 804 | $ 70.00 | 10% |
| 196 | Total Prize Available | $ 700.00 | |

FIG. 31

186

| | | |
|---|---|---|
| 188 | Prize 1 | $ 350.00 |
| 190 | Prize 2 | $ 100.00 |
| 192 | Prize 3 | $ 50.00 |

FIG. 32

186

| | 106 | 184 |
|---|---|---|
| | Score to Beat | Prize |
| 188 | 986 | $ 441.00 |
| 190 | 912 | $ 126.00 |
| 192 | 804 | $ 63.00 |
| 196 | Total Prize Available | $ 630.00 |

FIG. 33

186

| | 106 | 184 |
|---|---|---|
| | Score to Beat | Prize |
| 188 | 986 | $ 132.30 |
| 190 | 912 | $ 37.80 |
| 192 | 804 | $ 18.90 |
| 196 | Total Prize Available | $ 189.00 |

FIG. 34

160

| Actual RTP %* | (25 cent denomination) | | | |
|---|---|---|---|---|
| | Stars | | | |
| Bet (Credits) | 0 | 1 | 2 | 3 |
| 8 | 86.33% | 87.29% | 88.89% | 89.99% |

*Does not include increment% from progressives or high score bonus

FIG. 35

160

| Base RTP %* | (25 cent denomination) | | | |
|---|---|---|---|---|
| | Stars | | | |
| Bet (Credits) | 0 | 1 | 2 | 3 |
| 8 | 89.99% | 89.99% | 89.99% | 89.99% |

*Does not include increment% from progressives or high score bonus

FIG. 36

160

| Deferment % | (25 cent denomination) | | | |
|---|---|---|---|---|
| | Stars | | | |
| Bet (Credits) | 0 | 1 | 2 | 3 |
| 8 | 3.66% | 2.70% | 1.10% | 0.00% |

FIG. 37

186

Total Deferment for 5000 Sessions — Total Wagers 5000

| | Stars | | | |
|---|---|---|---|---|
| Bet (Credits) | 0 | 1 | 2 | 3 |
| 8 | $120.77 | $113.39 | $16.50 | $0.00 |

FIG. 38

186

Total Leaderboard Increment for 5000 Sessions (25 cent denomination) — Total Wagers 5000

| | Stars | | | |
|---|---|---|---|---|
| Bet (Credits) | 0 | 1 | 2 | 3 |
| 8 | $47.85 | $60.90 | $21.75 | $14.50 |

FIG. 39

186

Total Leaderboard Accumulation for 5000 game Sessions

| Bet (Credits) | Total |
|---|---|
| 8 | $395.65 |

FIG. 40

GAMING MACHINE AND METHODS FOR OPERATING GAMING MACHINES TO PROVIDE SKILL-BASED WAGERING GAMES TO PLAYERS

CROSS-REFERENCE TO RELATED APPLICATION

This application is a continuation of U.S. patent application Ser. No. 16/940,005, filed Jul. 27, 2020, which is a continuation of U.S. patent application Ser. No. 15/694,000, filed Sep. 1, 2017, which claims priority to U.S. Provisional Patent Application Ser. No. 62/383,314, filed Sep. 2, 2016, the disclosures of which are hereby incorporated by reference in their entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming machines and more particularly, to gaming machines and methods for operating gaming machines to provide skill-based wagering games to players.

BACKGROUND OF THE INVENTION

Known gaming machines include a video display device to display a reel game that includes a plurality of reels with each reel including a plurality of symbols. During game play, the gaming machine accepts a wager from a player, the player selects one or more paylines, the gaming machine spins the reels, and sequentially stops each reel to display a combination of symbols on the reels. The gaming machine then awards the player an award based on the combination of symbols orientated along the selected payline. At least some known gaming machines may also include bonus feature games that may include additional free spins and/or progressive awards.

Overtime, players may become frustrated with known wagering game feature because the games have limited player interaction and affect on the game outcome. Accordingly, new features are necessary to appeal to player interest and enhance excitement in order to entice longer play and increased profitability. The present invention is directed to satisfying these needs.

SUMMARY OF THE INVENTION

In one aspect of the present invention, a gaming machine for providing a skill-based wagering game to a player is provided. The gaming machine includes a display device, a user input device, a memory device, and a controller. The display device is configured to display the skill-based wagering game. The user input device includes a player operating device that is configured to generate a signal indicating a player skill operation by the player and an acceptor device that is configured to accept physical media associated with a monetary value to establish a credit balance associated with the player. The memory device stores return to player (RTP) value data. The RTP value data includes a plurality of RTP values. Each RTP value indicates an average award amount provided to players over time and is associated with a wager amount value and an award skill level. The controller includes a processor that is programmed to receive a signal indicating a wager amount being received from the player via the user input device and initiate the skill-based wagering game. The processor generates and displays the skill-based wagering game including a plurality of skill events, receives player skill operations from the player via the user input device in response to the displayed skill events, and determines a player skill level value associated with the player based on the received player skill operations. The processor accesses the RTP value data and determines an RTP value based on the determined player skill level value and the received wager amount, generates a plurality of primary awards as a function of the determined RTP value, displays a primary award selection screen on the display device to allow the player to select a primary award from the plurality of primary awards in response to the player's operation, and adjusts the credit balance based on the player selected primary award.

In another aspect of the present invention, a computer-implemented method of operating a gaming machine, is provided. The gaming machine includes a display device, a user input device, and a controller including a processor. The method includes the controller receiving a signal indicating a wager amount being received from the player via the user input device and initiating the skill-based wagering game. The user input device includes a player operating device that is configured to generate a signal indicating a player skill operation by the player, and an acceptor device that is configured to accept physical media associated with a monetary value to establish a credit balance associated with the player. The controller generates and displays the skill-based wagering game on the display device including a plurality of skill events. The controller receives player skill operations from the player via the user input device in response to the displayed skill events and determines a player skill level value associated with the player based on the received player skill operations. The controller accesses RTP value data being stored on a memory device that includes a plurality of RTP values indicating an average award amount provided to players over time and being associated with a wager amount value and an award skill level. The controller determines an RTP value based on the determined player skill level value and the received wager amount, generates a plurality of primary awards as a function of the determined RTP value, displays a primary award selection screen on the display device to allow the player to select a primary award from the plurality of primary awards in response to the player's operation, and adjusts the credit balance based on the player selected primary award.

In yet another aspect of the present invention, one or more non-transitory computer-readable storage media, having computer-executable instructions embodied thereon, is provided. The computer-executable instructions cause a processor to receive a signal indicating a wager amount being received from the player via a user input device that includes a player operating device configured to generate a signal indicating a player skill operation by the player and an acceptor device configured to accept physical media associated with a monetary value to establish a credit balance associated with the player. The processor generates and displays a skill-based wagering game on a display device that includes a plurality of skill events upon receiving the signal indicating a wager amount. The processor receives player skill operations from the player via the user input device in response to the displayed skill events and determines a player skill level value associated with the player based on the received player skill operations. The processor accesses RTP value data being stored on a memory device that includes a plurality of RTP values indicating an average award amount provided to players over time and being associated with a wager amount value and an award skill level. The processor determines an RTP value based on the determined player skill level value and the received wager amount and generates a plurality of primary awards as a function of the determined RTP value. The processor displays a primary award selection screen on the display device to select a primary award from the plurality of primary awards in response to the player's operation and adjusts the credit balance based on the player selected primary award.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 15-40 are exemplary illustrations of data that may be generated by the gaming machine shown in FIGS. 1A-1B for use in generating a skill-based wagering game, according to an embodiment of the present invention.

Corresponding reference characters indicate corresponding parts throughout the drawings.

DETAILED DESCRIPTION OF THE PREFERRED EMBODIMENT

Figure 1A:
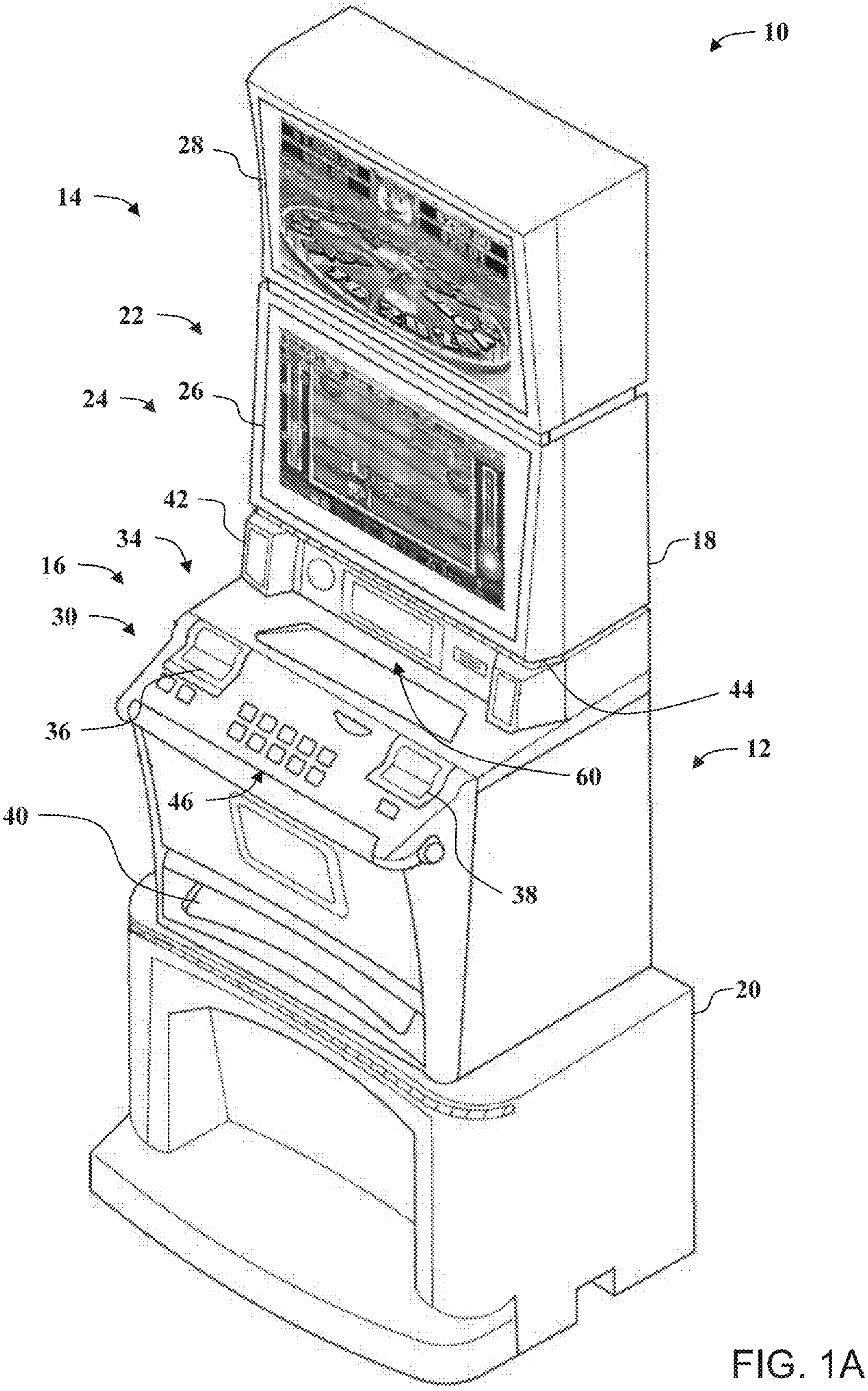
FIGS. 1A and 1B are perspective views of an exemplary gaming machine for use in providing a skill-based wagering game to a player, according to an embodiment of the present invention.

With reference to the drawings and in operation, the present invention overcomes at least some of the disadvantages of known gaming systems by providing a gaming machine that provides a skill-based wagering game that allows the player to place wagers and receive awards based on the player's skill in performing skill-based events.

The gaming machine provides a game of skill which pays an award to a player of the game based on the player's skill. The skill-based wagering game may include a wide range of skill games for a casino, such as for example, wagering music games, shooting games, racing games, fighting games, sports games and the like.

In one embodiment, the skill-based wagering game may include a game similar to Fogger Get Hoppin™, published by Konami Ltd. In general, an animated game character is displayed within a game map including a plurality of open spaces and a plurality of obstacles. The player is required to move the game character along the game map by selecting (·X·) one of a predefined number of location options within a portion of the game map. The player is allotted a predefined period of time in which to move the game character as far along the game map as possible before the expiration of time. Moving the game character into a space occupied by an obstacle results in a predefined time penalty. The player accumulates points as the game character is successfully navigated along the game map while avoiding obstacles.

The gaming machine determines a skill level of the player based on the amount of points accumulated during an instance of the game and changes an award determination table based on the determined skill level of the player. For a low-skill player, the gaming machine may use an award determination table which assures minimum return to player (RTP) percentage to the player. For a high-skill player, the gaming machine may use a different award determination table which provides more chance for a larger award. By providing different award determination tables based on skill levels, the gaming machine a) assures the minimum RTP (%) for low-level skill players and b) provides a chance to win high prize for high-level skill players concurrently. As used herein, the term "Return to Player" describes a value indicating an amount of wagered funds that will be returned to players over a predefined period of time. For example, instance, a gaming machine having an RTP of 95% is expected to return $95 out of every $100 put in over a predefined period of time. For example, a gaming machine implementing a skill-based wagering game and selecting an award determination table based on the determined skill level of the player is described in U.S. patent application Ser. No. 15/261,775 to Hirai et al., filed Sep. 9, 2016, titled "Gaming Machine and Methods of Operating Gaming Machines to Provide Skill-Based Wagering Games to Players", which is incorporated herein by reference in its entirety.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1B:
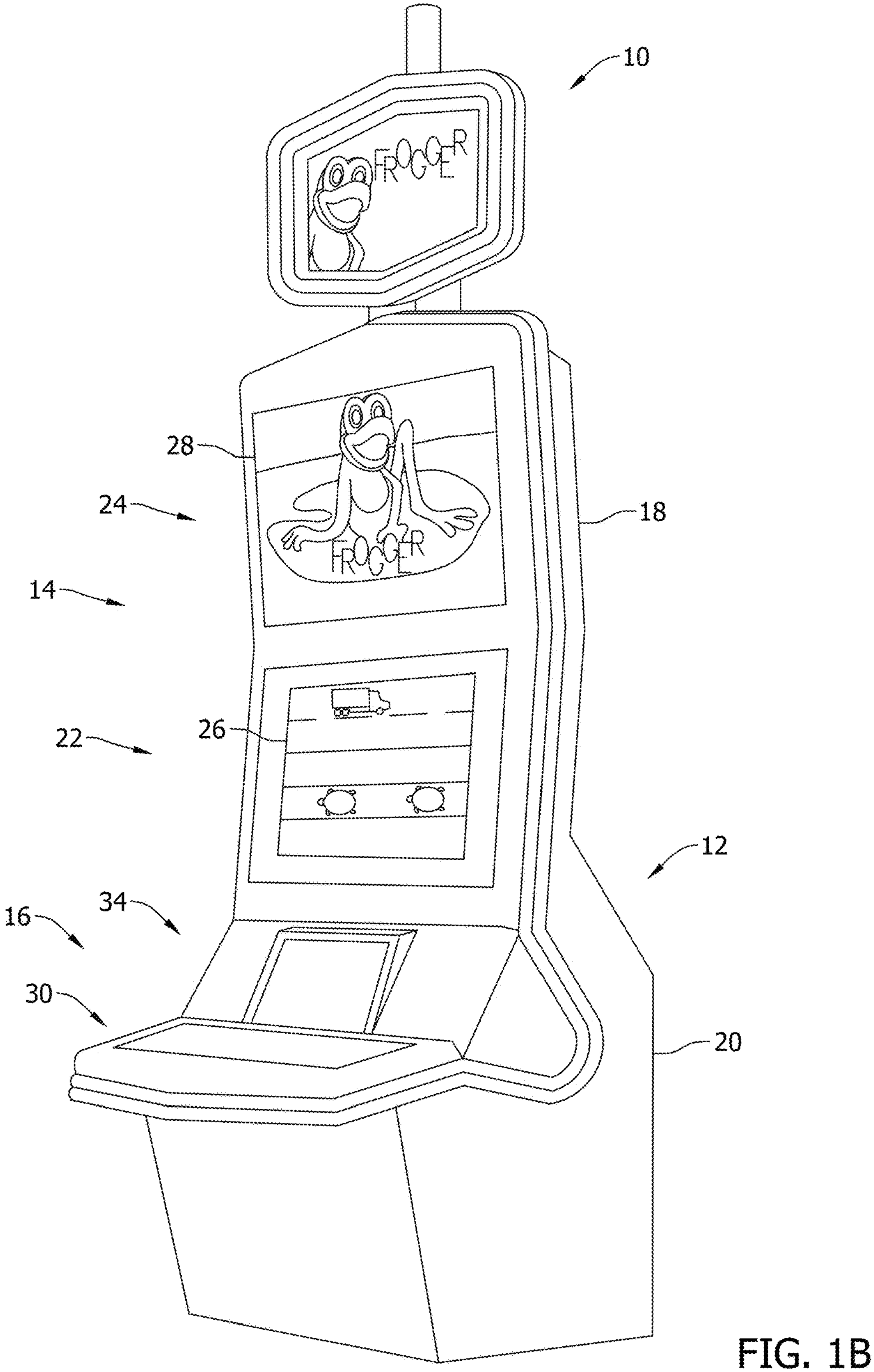
Figure 2:
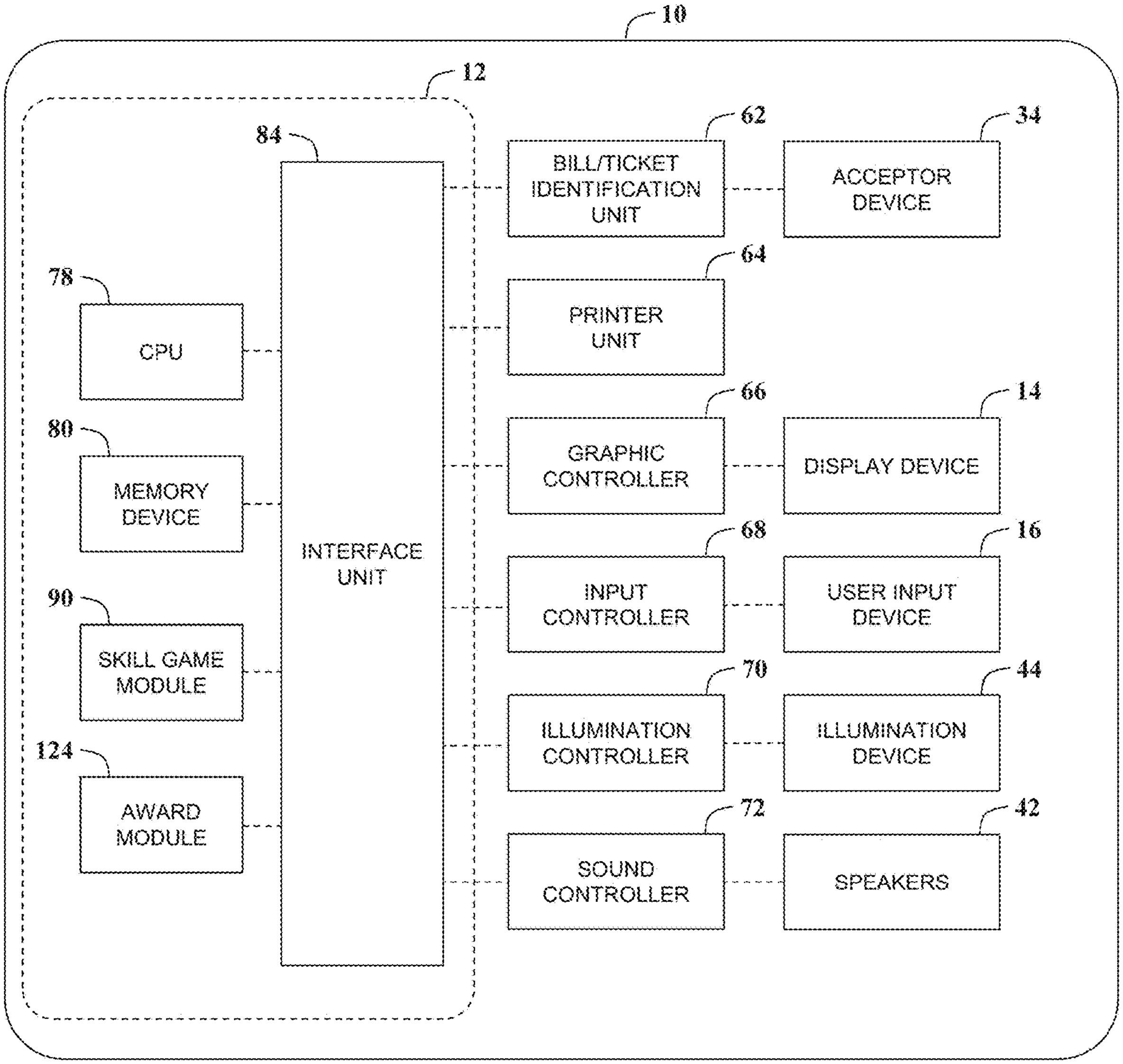
FIG. 2 is a functional block diagram of the gaming machine shown in FIGS. 1A-1B, according to an embodiment of the present invention.

FIGS. 1A and 1B are perspective views of an exemplary gaming machine 10 for providing a skill-based wagering game to a player, according to an embodiment of the present invention. FIG. 2 is a functional block diagram of the gaming machine 10. In the illustrated embodiment, the gaming machine 10 includes a gaming controller 12, a display device 14 for displaying a plurality of games, and a user input device 16 to enable a player to interface with the gaming machine 10. The gaming controller 12 is operatively coupled to the display device 14 and the user input device 16 to enable a player to play games being displayed on the display device 14. In one embodiment, the gaming machine 10 may include a gaming machine installed in a casino. In another embodiment, the gaming machine 10 may include a personal computer, laptop, cell phone, smartphone, tablet computer, personal data assistant, and/or any suitable computing device.

In the illustrated embodiment, the gaming machine 10 also includes a cabinet assembly 18 that is configured to support the display device 14, the user input device 16, and/or the gaming controller 12 from a gaming stand 20 and/or a supporting surface. The display device 14 and the user input device 16 are each coupled to the cabinet assembly 18 and are each accessible by the player. In one embodiment, the gaming controller 12 is positioned within the cabinet assembly 18. Alternatively, the gaming controller 12 may be separated from the cabinet assembly 18, and connected to components of the gaming machine 10 through a network such as, for example, a LAN, a WAN, dial-in-connections, cable modems, wireless modems, and/or special high-speed ISDN lines. For example, in one embodiment, the gaming controller 12 may be located remotely with respect to the gaming machine 10, or within another gaming machine cabinet assembly 18.

In the illustrated embodiment, the display device 14 is configured to display a skill-based wagering game 22 on a game screen 24 (shown in FIGS. 5-14) including computer-generated graphic images for use in the skill-based wagering game 22 such as, for example, sequential images used in maze-type video games such as the Frogger™ published by Konami, Ltd., role playing video arcade such as Castlevania™, Metal Gear Solid™, and Contra™ published by Konami, Ltd., shooting games such as Gradius™ published by Konami, Ltd., vehicle arcade racing games such as Road Fighters™, published by Konami, Ltd., and/or sports related arcade games such as Pro Evolution Soccer™ published by Konami, Ltd. In addition, the skill-based wagering game 22 may include any type of game including, but not limited to, a role-playing game, a puzzle game, a maze-type game, a video slot game, a keno game, a blackjack game, a video poker game, or any type of game which allows a player to make a wager, play a game, and potentially provide the player an award based on an outcome of the game and a paytable.

In the illustrated embodiment, the display device 14 may include a first display 26 and a second display 28. In one embodiment, each display 26 and 28 may be configured to display at least a portion of the game screen 24. In addition, the display device 14 may be configured to display the game screen 24 on the first display 26 and/or the second display 28. In one embodiment, the display device 14 may be configured to display the skill-based wagering game on the first display 26 and display a secondary wagering game on the second display 28. For example, the secondary wagering game may include a video slot game described in U.S. patent application Ser. No. 14/855,993 to Gilmore et al., filed Sep. 16, 2015, titled "Gaming Machine and Methods of Providing Games to Players Having Player Characters and Enemy Characters", which is incorporated herein by reference in its entirety.

In one embodiment, the first display 26, and/or the second display 28 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. The first display 26 and/or the second display 28 may also include a touch screen. Alternatively, a single component, such as a touch screen, may function as both the display device 14 and as the user input device 16.

In the illustrated embodiment, the user input device 16 includes a player operating device 30 including a touch button unit 32 (shown in FIG. 5) for receiving a player's operation and an acceptor device 34 including a coin slot 36, and/or a bill acceptor 38.

The acceptor device 34 is configured to accept media associated with a monetary value to establish a credit balance. In one embodiment, the acceptor device 34 includes a validator device configured to identify physical media, and a cash-out button actuatable to cause an initiation of a payout associated with the credit balance. In one embodiment, the acceptor device 34 may be configured to receive physical media such as, for example, a coin, a medal, a ticket, a card, a bill, currency, and/or any suitable physical media that enables the gaming machine 10 to function as described herein. The acceptor device 34 may also be configured to accept virtual media such as, for example, an RFID signal, a keypad and/or touch screen entry, a personal identification number and/or identifier, a player tracking account, a virtual credit balance, reward points, gaming credits, bonus points, and/or any suitable virtual media that enables the gaming machine 10 to function as described herein. For example, the coin slot 36 includes an opening that is configured to receive coins and/or tokens deposited by the player into the gaming machine 10. The gaming controller 12 includes software code that converts a value of the coins and/or tokens to a corresponding amount of gaming credits that are used by the player to wager on games played on the gaming machine 10.

The bill acceptor 38 includes an input and output device that is configured to accept a bill, a ticket, and/or a cash card into the bill acceptor 38 to enable an amount of gaming credits associated with a monetary value of the bills, ticket, and/or cash card to be credited to the gaming machine 10. The bill acceptor 38 may also include the validator device to identify bills, ticket, and/or cash card received by the gaming machine. Moreover, the gaming machine 10 may also utilize a cashless wagering system (not shown), such as a ticket in ticket out (TITO) system (not shown). In one embodiment, the bill acceptor 38 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown). In one embodiment, the acceptor device 34 and/or the validator device may include the coin slot 36, the bill acceptor 38, a TITO system, a cashless wagering system, and/or a player tracking device.

A coin hopper 40 is coupled to the cabinet assembly 18 and is configured to receive a plurality of coins that are dispensed from the gaming machine 10. One or more speakers 42 are installed inside the cabinet assembly 18 to generate voice announcements and/or sound effects associated with game play. The gaming machine 10 also includes one or more illumination lighting devices 44 that are configured to blink and/or change brightness and color in specific patterns to produce lighting effects to enhance a visual gaming experience for the player.

Figure 5:
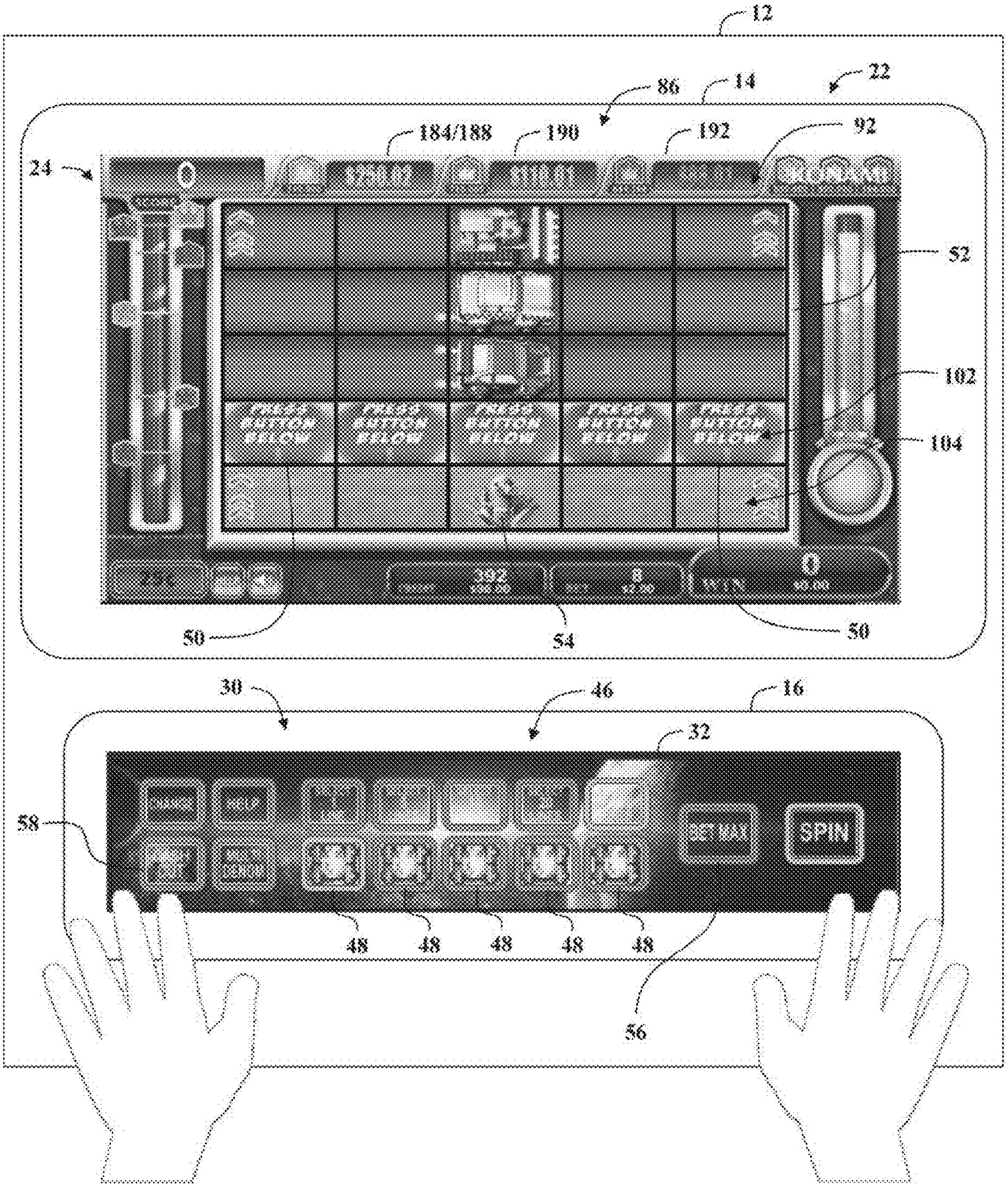
FIGS. 5-6 are schematic views of the gaming machine shown in FIGS. 1A-1B illustrating exemplary entertaining graphical displays of a game screen including a skill-based wagering game that may be displayed on the gaming machine, according to an embodiment of the present invention.

The touch button unit 32 includes a plurality of touch buttons 46 that are configured to receive a touch input from the player to enable the player to play the skill-based wagering game. In one embodiment, as shown in FIG. 5, the touch button unit 32 includes a plurality of character position buttons 48 that are each associated with a predefined character position 50 being displayed in the skill-based wagering game 22. For example, the gaming controller 12 may operate the first display 26 to display the game screen 24 including a plurality of predefined character positions 50 displayed along a game map 52. Each character position 50 is associated with one of the character position buttons 48 such that an operation of a character position button 48 by the player causes the gaming controller 12 to move the game character 54 to the corresponding character position 50 within the game map 52. For example, in one embodiment, when a corresponding character position button 48 is actuated by the player, e.g., depressed by the player, a corresponding mechanical switch transmits a signal indicated the actuation of the character position button 48 to the gaming controller 12. The gaming controller 12 then executes the operation associated with the corresponding character position button 48 and moves the game character 54 to character position 50 corresponding to the actuated character position buttons 48. As shown in FIG. 5, in one embodiment, the touch button unit 32 may include five character position buttons 48 corresponding to five character positions 50 that the game character 54 may be moved to.

In one embodiment, the touch buttons 46 may include a plurality of BET switches 56 for inputting a wager on a game and initiating the game and a PAYOUT switch 58 (shown in FIG. 5) for ending a gaming session and dispensing accumulated gaming credits to the player. In another embodiment, the user input device 16 may include a video touch display that displays video images of the touch buttons 46. The user input device 16 may also include a touchless display being displayed with changeable video images of the touch buttons.

The gaming machine 10 also includes a player tracking device 60 that is coupled to the gaming controller 12 for identifying the player and/or a player tracking account that is associated with the player. The player tracking account may include, but is not limited to, gaming credits available to the player for use in playing the gaming machine 10. The player tracking device 60 is configured to communicate player account information between a player tracking system (not shown) and the gaming machine 10. For example, the player tracking device 60 may be used to track bonus points and/or credits awarded to the player during a gaming session and/or track bonus and/or credits downloaded to the gaming machine 10 from the player tracking system. In the illustrated embodiment, the player tracking system assigns a player status, e.g., a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 60 is coupled to the gaming cabinet assembly 18 and includes a player identification card reader, a data display, and a keypad. The player identification card reader is configured to accept a player tracking card (not shown) inserted by the player, and read information contained on the player tracking card to identify the player account information. The player identification card reader may include, but is not limited to, a barcode reader, a magnetic card reader, IC card reader, and/or a radio frequency identification (RFID) card reader. The keypad is configured to accept a user selection input such as, for example, a unique player personal identification number (PIN) to facilitate enabling the gaming machine 10 to identify the player, and access player account information associated with the identified player to be displayed on the data display. In one embodiment, the data display includes a touchscreen panel that includes the keypad. Alternatively, the data display and the keypad may be included in the display device 14.

Referring to FIG. 2, in one embodiment, the gaming machine 10 may include the gaming controller 12, a bill/ticket identification unit 62, a printer unit 64, a graphic controller 66, an input controller 68, an illumination controller 70, and a sound controller 72. The gaming controller 12 includes a processor, i.e., a central processing unit (CPU) 78, a memory device 80, and an interface unit 84. The interface unit 84 includes a bus that is configure to transmit signals and data between the CPU 78 and the bill/ticket identification unit 62, the printer unit 64, the graphic controller 66, the input controller 68, the illumination controller 70, the sound controller 72, and the memory device 80 to enable the gaming controller 12 to operate the gaming machine 10 to provide the skill-based wagering game 22 as described herein.

The memory device 80 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the gaming controller 12 to store, retrieve, and/or execute instructions and/or data.

The CPU 78 executes various programs, and thereby the gaming controller 12 controls other components of the gaming machine 10 according to player instructions and data accepted by the user input device 16. The CPU 78 in particular executes a game program, and thereby conducts a game in accordance with the embodiments described herein. The memory device 80 stores programs and information used by the CPU 78. Moreover, the memory device 80 stores and retrieves information including, but not limited to, wagers, wager amounts, skill-based game events, and image data for producing game images and/or screens on the display device 14, and temporarily stores variables, parameters, and the like that are used by the CPU 78. In addition, the memory device 80 stores software programs and data related to indicia, game images, player skill values, data files, and/or award paytables which represent relationships between combinations of random numbers, types of awards, and player skill level values (shown in FIGS. 15-40). In one embodiment, the memory device 80 utilizes RAM to temporarily store programs and data necessary for the progress of the game, and EPROM to store, in advance, programs and data for controlling basic operation of the gaming machine 10, such as the booting operation thereof.

The bill/ticket identification unit 62 manages the amount of player's credits, which is equivalent to the amount of coins and bills counted and validated by the acceptor device 34. The bill/ticket identification unit 62 may also convert a player's credits to coins, bills, or other monetary data by using the coin hopper 40 and/or for use in dispensing a credit voucher via the bill acceptor 38. The printer unit 64 is configured to print ticket vouchers used with a cashless wagering system.

The graphic controller 66 controls the display device 14 to display various images on a graphical interface including the game screen 24 preferably by using computer graphics and image data stored in the memory device 80. More specifically, the graphic controller 66 generates and displays the images being displayed with the game including images being displayed on the first display 26 and the second display 28 by using computer graphics and the image data.

The input controller 68 monitors player operations received through the user input device 16, accepts various instructions and data that a player enters through the user input device 16, and transmits signals indicative of player's operations to the gaming controller 12.

The illumination controller 70 controls one or more illumination devices 44 to blink and/or change brightness and color in specific patterns in order to produce lighting effects associated with game play. The sound controller 72 controls the speakers 42 to output voice announcements and sound effects during game play.

In the illustrated embodiment, the gaming controller 12 generates random numbers for use in generating and displaying the skill-based wagering game 22. The random numbers are preferably generated at the start of each round of a game. The gaming controller 12 uses the random numbers to determine an outcome of the games. For example, the gaming controller 12 uses the random numbers to randomly select award paytables and/or game maps that may be used during the skill-base game to provide awards to the player based on the level of skill demonstrated by the players during the game. Moreover, the gaming controller 12 generally uses the generated random numbers to play the games and to determine whether or not to provide an award to a player. In general, the term "award" may be a payout, in terms of credits or money. Thus, the gaming controller 12 may award a regular payout in response to the outcome of the game. However, it should be noted that the term award may also refer to other types of awards, including, prizes, e.g., meals, show tickets, etc . . . , as well as in-game award, such as bonus features, free games, and/or free spins, or awarding the player one or more wild symbols or stacked wild symbols in each of the games. The gaming controller 12 may generate random numbers by executing software program modules using the CPU 78. Alternatively, the gaming controller 12 may include a hardware random number generator unit which generates random numbers using physical methods.

In the illustrated embodiment, the gaming controller 12 generates and displays the skill-based wagering game 22 including a skill-based game sequence 86 (shown in FIGS. 5-8) and an award sequence 88 (shown in FIGS. 9-14). The gaming controller 12 includes a skill game module 90 that includes software program code and resource data for use in executing the skill-based game sequence 86 of the skill-based wagering game 22 being displayed on the display device 14. In the illustrated embodiment, the skill-based game sequence 86 of the skill-based wagering game 22 includes one or more skill events that must be completed by the player. The gaming controller 12 is programmed to determine a skill level of the player based on the player's operations being made during the skill event, and determine an award to be provided to the player based on the determined skill level. In some embodiments, the skill-based game may include any game that allows the player to affect the outcome of the skill-based game through a series of player operations. The skill-based game may also include a player skill component associated with the player's operation that may include physical or manual dexterity, digital dexterity, hand-eye coordination (e.g., aim), reflexes, memory, cognitive processing, knowledge, and/or strategy-based selection. Skill-based games may include, but are not limited to including, maze-type games, role-playing arcade-type games, first-person shooting games, sporting games, memory games, matching games, and/or any suitable game that includes a skill component and that enables the outcome of the game to be at least partially determined based on a player's operation.

For example, with reference to FIGS. 5-8, in the illustrated embodiment, the skill game module 90 includes software program code and resource data that cause the gaming controller 12 to display and execute the skill-based wagering game 22 including a maze-type skill game that allows a player to navigate a game character through a series of obstacles displayed in a game map, such as, for example, Frogger™ published by Konami, Ltd.

Figure 6:
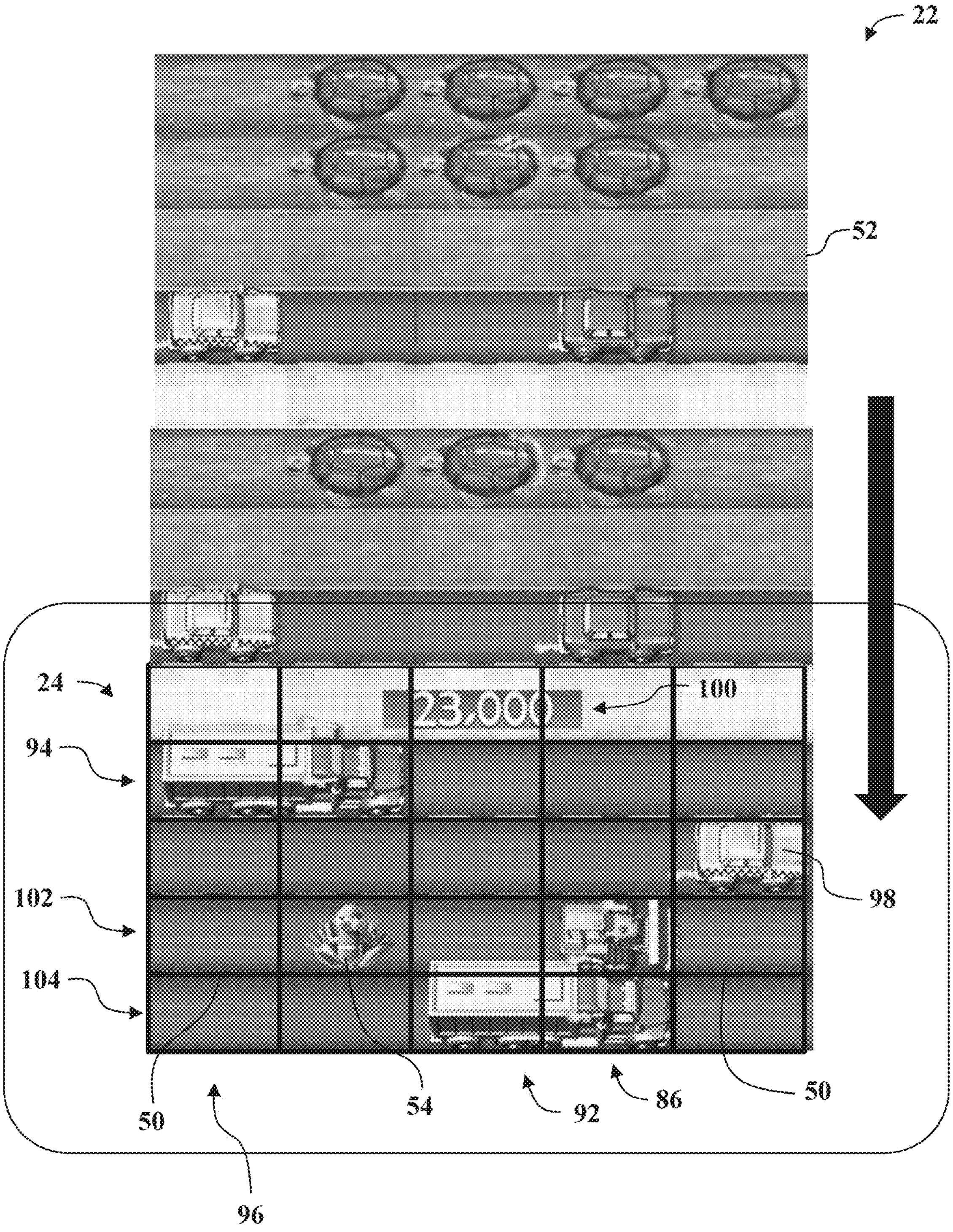

The gaming controller 12 is programmed to display a game screen 24 on the display device 14 including the skill-based wagering game 22 including a game map 52 and a movable character 54 that is being displayed with the game map 52. The game map 52 includes a plurality of character positions 50 that are arranged in a matrix 92 including a plurality of rows 94 and a plurality of columns 96. A plurality of obstacles 98 and a plurality of bonus skill items 100 (shown in FIG. 6) are displaying within the plurality of character positions 50 along the game map 52. During game play, the player navigates the game character 54 through the game map 52 by selecting character positions 50 using the character position button 48 displayed in the user input device 16. As shown in FIG. 6, as the game character 54 moves along the game map 52, a number of obstacles 98 appearing in the character positions 50 increases, thus increasing the difficulty of game play requiring increased player skill.

As shown in FIGS. 5-6, in one embodiment, the gaming controller 12 displays the game including a destination row 102 of character positions 50 and an initial position row 104 of character positions 50. The destination row 102 of character positions 50 includes the character positions 50 that are available to move the game character 54 into during a single player skill selection. The initial position row 104 includes character positions 50 that display the current position of the game character 54 during game play.

Figure 7:
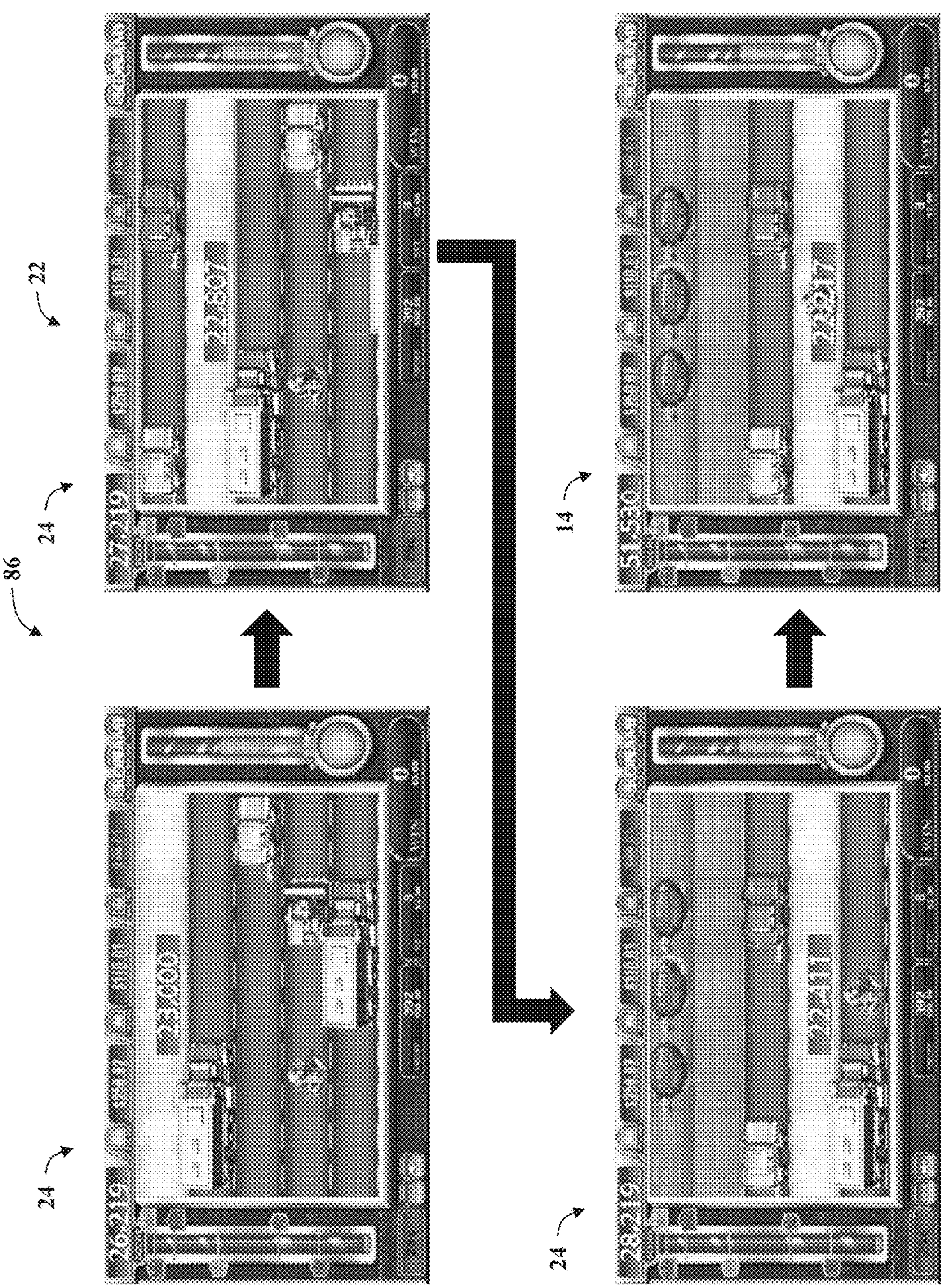
FIG. 7 illustrates a sequence of exemplary entertaining graphical displays of a game screen including a skill-based wagering game that may be displayed on the gaming machine shown in FIGS. 1A-1B, according to an embodiment of the present invention.

For example, during game play, the player is allowed to move the game character 54 from a character position 50 display in the initial position row 104 to one of the character positions 50 displays in the destination row 102. Upon receiving a player's skill operation of a character position button 48, the gaming controller 12 moves the game character 54 from the initial position row 104 to a character position 50 in the destination row 102 corresponding to the player operated character position button 48. As shown in FIG. 6, during game play, only a portion of the game map 52 is being displayed within the game screen 24. As the player moves the game character 54 to a character position 50 within the destination row 102, the gaming controller 12 advances the game character 54 along the game map 52 by shifting a portion of game map 52 vertically downward to display an additional portion of the game map 52 on the game screen 24. In addition, the game character 54 moves to the initial position row 104 such that new character positions 50 are available in the destination row 102. For example, as shown in FIGS. 5-7, upon receiving a player's skill operation of a character position 50 along the destination row 102, the gaming controller 12 moves the game character 54 to the selected character position 50 and advances the game map 52 one row 94. By advancing the game map 52 during game play, the gaming controller 12 displays character positions 50 that will be available to the game character 54 as the game character 54 is moved through the game map 52, thereby allowing the player to anticipate player operations and corresponding placement of the game character 54 as the as the game character 54 is moved through the game map 52.

In the illustrated embodiment, the gaming controller 12 is programmed to assign a point value to each player skill operation being made by the player during play of the skill-based wagering game 22, and to generate a player skill level value 106, e.g., a total point score (shown in FIG. 8) including the sum of the point values acquired by the player during an instance of the game. For example, during game play, the gaming controller 12 is configured to receive a player's operation of a character position button 48 corresponding to a character position 50 within the destination row 102 and determine a point value associated with the selected character position 50. The gaming controller 12 accumulates a running tally of point values acquired by the player through the sequence of player skill operations of character positions 50 to advance the game character 54 along the game map 52. For example, navigating the game character to a character position 50 that includes an obstacle 98 results in a zero point value being awarded to the player, whereas navigation the game character 54 to an open character position 50 that does not include an obstacle 98 result in the award of a positive point value.

In one embodiment, the gaming controller 12 may generate and store in the memory device 80 point value data 108 (shown in FIG. 22) that includes information indicating point values that are associated with various skill events such as, for example, selection of character positions 50. The gaming controller 12 uses the point value data 108 to determine point values associated with the player selected character positions 50. During game play, upon receiving a player's operation of a character position button 48 corresponding to a character position 50 within the destination row 102, the gaming controller 12 may access the point value data 108 to determine a point value associated with the selected character position 50. For example, upon determining that the selected character position 50 is an open character position that does include an obstacle, the gaming controller awards a point value between 1 point to 25 points. In addition, if the selected character position 50 includes a bonus character item, the gaming controller awards a point value equal to 5 points. In one embodiment, a bonus point item 100 (shown in FIG. 6) may be displayed along the game map 52. The bonus point item 100 includes an amount of bonus points that are awarded to the player upon navigating the game character 54 to the corresponding character position 50. In the illustrated embodiment, the amount of bonus points that are available decrease overtime.

Figure 8:
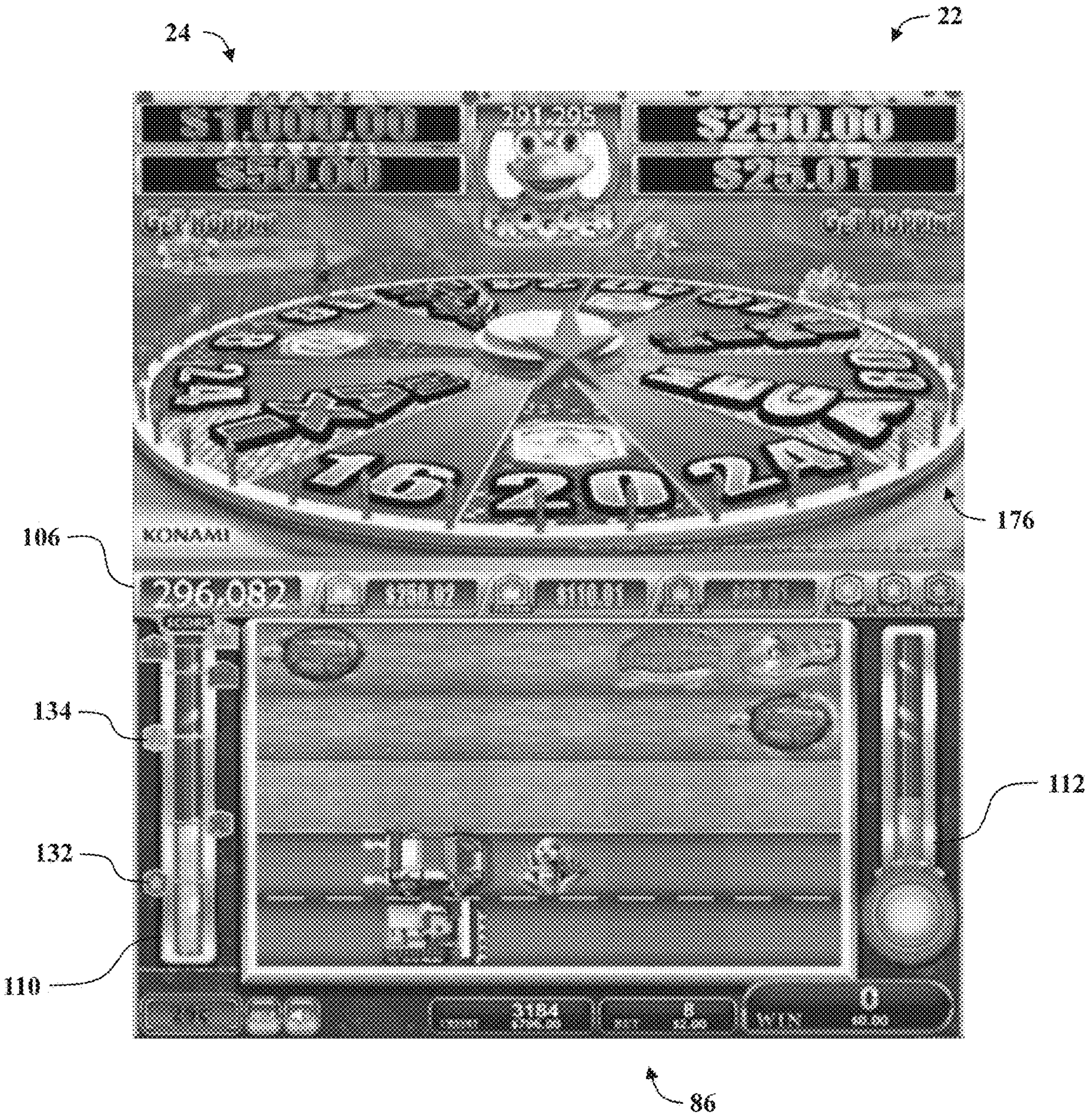
FIGS. 8-12 are exemplary entertaining graphical displays of a game screen including a skill-based wagering game that may be displayed on the gaming machine shown in FIGS. 1A-1B, according to an embodiment of the present invention.

In one embodiment, the gaming controller 12 displays a point scale 110 (shown in FIG. 8) that displays a including a graphic illustration of the running total of the point values being accumulated by the player during the skill-based game sequence 86 of the skill-based wagering game 22. For example, as shown in FIGS. 7-8, the point scale 110 may include a graphic bar that increases in height as the point values are accumulated by the player.

In the illustrated embodiment, the gaming controller 12 allocates a predefined amount of time to each instances of the skill-based game sequence 86 played by the player. For example, in one embodiment, the gaming controller 12 allocates a 15-second time period to each instance of the game, during which the player attempts to accumulate points by performing a series of player skill operations to navigate the game character 54 through the game map 52. In one embodiment, the gaming controller 12 displays a time counter 112 (shown in FIG. 8) that illustrates the time remaining during game play. In one embodiment, the time counter 112 includes a graphic bar that decreases in height corresponding to the running of the predefined period of time.

Upon expiration of the predefined time period, the gaming controller 12 terminates skill-based game sequence 86 of the skill-based wagering game 22 and determines a player skill level value including the total point score 106 achieved by the player during the game play. The gaming controller 12 calculates the total point score 106 including the sum of the point values associated with the selected character position 50 and bonus points associated with any bonus point items accumulated during the skill-based game sequence 86. The gaming controller 12 then accesses a skill point data 114 (shown in FIG. 21) being stored in the memory device 80 and generates a player score record 116 that includes a unique game instance identifier assign to the current game instance, the total point score 106 achieved during the game instance, and a time stamp data. In one embodiment, the gaming controller 12 may generate the player score record 116 including a unique player identifier that may be assigned by the player via a leaderboard screen 118 (shown in FIG. 12) or randomly assigned by the gaming controller 12.

In one embodiment, the gaming controller 12 may generate and store in the memory device 80 game map data 120 that includes a plurality of game map data records 122 including information associated with various game maps 52 and a selection probability associated with each game map 52. In one embodiment, upon initiating an instance of the game, the gaming controller 12 is configured to randomly select a game map data record 122 using the selection probabilities in the game map data 120 and a random number generated by the game controller 12. The gaming controller 12 then accesses the game map code including in the selected game map data record 122 and executes the game map code to display the randomly selected game map 52 for use during the game.

In the illustrated embodiment, the gaming controller 12 includes an award module 124 that includes software program code and resource data for generating and displaying the award sequence 88 (shown in FIGS. 9-14) for providing awards to players based on skill points achieved during player of the skill-based wagering game 22. The gaming controller 12 is programmed to determine a skill level of the player based on the player's operations being made during the skill event, and determine an award to be provided to the player based on the determined skill level by executing the software program code included with the award module 124. For example, referring to FIGS. 9-10., in the illustrated embodiment, upon completion of the skill-based game sequence 86, the gaming controller 12 initiates the award sequence 88 and displays a primary award selection screen 126 that include a plurality of award selection images 128 associated with a plurality of primary awards 130. Each award selection image 128 is selectable by the player using the user input device 16 and/or a touchscreen display of the display device 14. The gaming controller 12 is programmed to select the plurality of primary awards 130 that are available to the player during the award sequence 88 based on the player skill level value achieved by the player during the skill-based game sequence 86.

Figure 9:
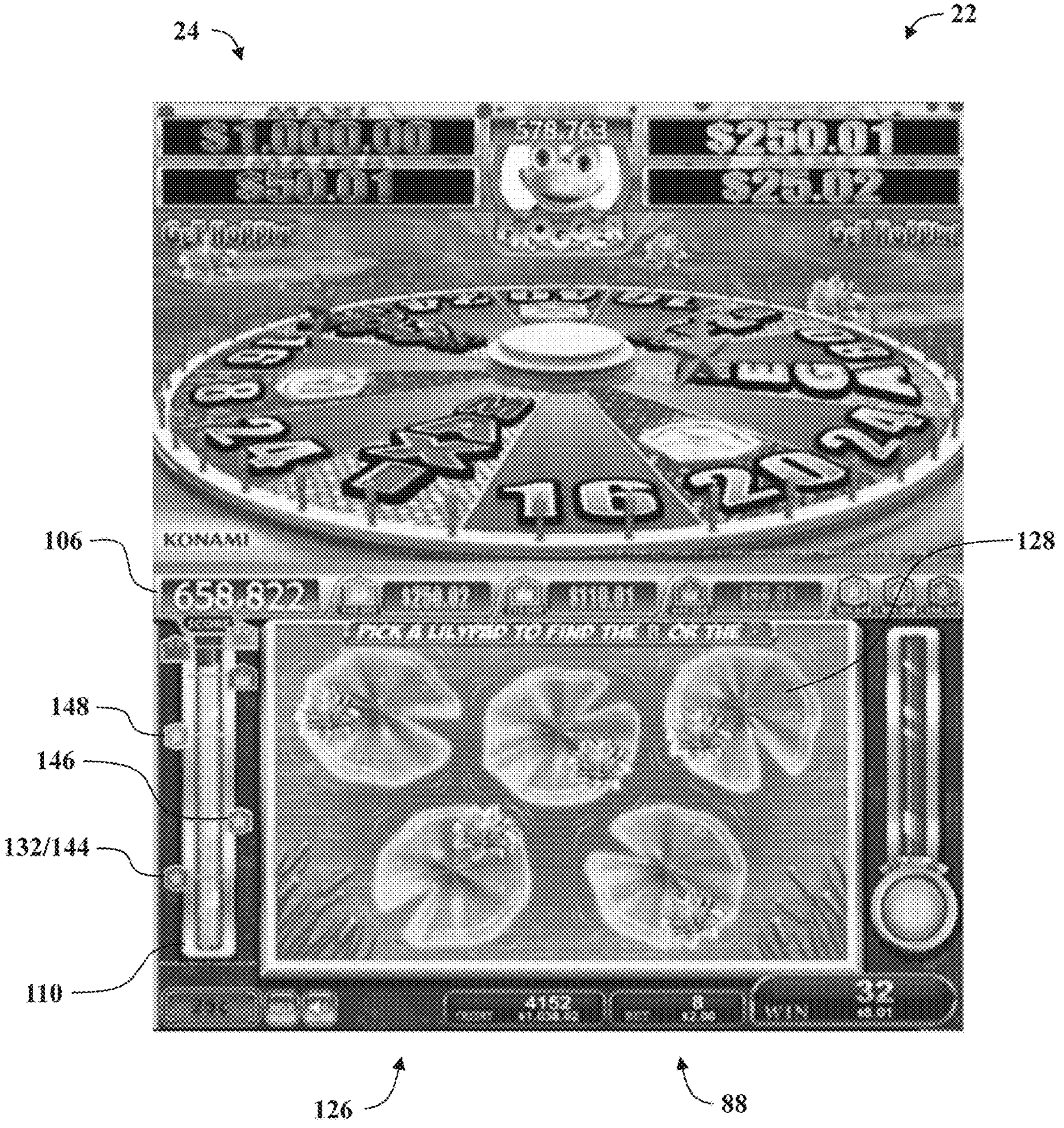

For example, in the illustrated embodiment, the gaming controller 12 generates a plurality of award skill levels 132 for use in selecting the plurality of primary awards 130 that are available to the player during the award sequence 88. Each award skill level 132 includes a numerical value that indicates the relative skill of players based on player skill level values. In one embodiment, the gaming controller 12 may graphically display each award skill level 132 with a different "Star" image 134 to indicate a relative amount of player skill level values associated with the award skill level 132. For example, as shown in FIGS. 8-9, the gaming controller 12 may display three "Star" images 134 along the point scale 110 to illustrate the relationship between the player skill level values 106 and the award skill level 132. In addition during the skill-based game sequence 86, as the player achieves increasing point totals, the gaming controller 12 may highlight a "Star" image 134 corresponding to an award skill level 132 associated with a point total achieved by the player as the player accumulates skill points during the skill-based game sequence 86.

In one embodiment, the gaming controller 12 may generate and store in the memory device 80 skill level data 136 (shown in FIG. 18) that includes a plurality of award skill levels 132. Each award skill level 132 is associated with a corresponding range of player skill level values 106. The skill level data 136 may include data records and/or software code instructions that enable the gaming controller 12 to generate the information being included in the skill level data 136.

During the award sequence 88, the gaming controller 12 is programmed to access the skill level data 136 and select the award skill level 132 associated with the range of skill level values 106 that includes the current player skill level value 106 achieved by the player during the skill-based game sequence 86. The gaming controller 12 then selects the plurality of primary awards 130 that are available to the player during the award sequence 88 based on the determined award skill level 132.

In one embodiment, each award skill level 132 may be associated with a predefined range of skill level values 106. In another embodiment, the gaming controller 12 may adjust each range of skill level values 106 associated with the award skill levels 132 based on previous player skill level values 106 obtained during previous instances of the skill-based wagering game 22. For example, in one embodiment, the gaming controller 12 may generate and store in the memory device 80 skill level adjustment data 138 (shown in FIG. 19). Prior to initiating the skill-based game sequence 86, the gaming controller 12 may access the skill point data 114 to retrieve the player score records 116 for a predefined number of previous instances of the skill-based wagering game 22. The gaming controller 12 may then access the skill level adjustment data 138 to generate each range of player skill level values 106 associated with the award skill level 132 based on the information included in the skill level adjustment 138.

For example, the skill level adjustment data 138 may include a player score ranking value 140 associated with each award skill level 132. The gaming controller 12 generates a ranked list of the player score records 116 retrieved from the skill point data 114 based on the total point score values in each player score record 116. The gaming controller 12 then determines the bottom 50% of player score records 116 from the ranked list of the player score records 116, and assigns a lowest award skill level 142, (e.g., a "0" award skill level, or "0" Stars) to the range of skill level values 106 inclusive of the bottom 50% of player score records 116. The gaming controller 12 also determines the top 50% of player score records 116 from the ranked list of the player score records 116 and assigns a low award skill level 144, (e.g., a "1" award skill level, or "1" Star) to a range of skill level values 106 having a minimum skill level value inclusive of the top 50% of player score records 116. For example, a player accumulating a total point value sufficient to fall within the top 50% of the ranked list of player score records 116 is assigned the low award skill level 144, e.g., 1 Star. Similarly, the gaming controller 12 determines the top 25% of player score records 116 from the ranked list of the player score records 116 and assigns a medium award skill level 146, (e.g., a "2" award skill level, or "2" Stars) to a range of skill level values 106 having a minimum skill level value inclusive of the top 25% of player score records 116, such that a player accumulating a total point value sufficient to be included within the top 25% of the ranked list of player score records 116 is assigned the medium award skill level 146, e.g., 2 Stars. In addition, the gaming controller 12 determines the top 10% of player score records 116 from the ranked list of the player score records 116 and assigns a high award skill level 148, (e.g., a "3" award skill level, or "3" Stars) to a range of skill level values 106 having a minimum skill level value inclusive of the top 10% of player score records 116, such that a player accumulating a total point value sufficient to be included within the top 10% of the ranked list of player score records 116 is assigned the high award skill level 148, e.g., 3 Stars. In one embodiment, the gaming controller 12 may be programmed to adjust each range of skill level values 106 such that a predefined percentage of player score records 116 are associated with each award skill level 132. For example, the skill level adjustment data 138 may include a player percentage value 150 associated with each award skill level 132. The gaming controller 12 generates each range of skill level values 106 such that the predefined percentage of player score records 116 fall within the corresponding range. For example, the gaming controller 12 may use the skill level adjustment data 138 to set the range of skill level values 106 associated with the lowest award skill level 142 to include 50% of the player score records 116, set the range of skill level values 106 associated with the low award skill level 144 to include 25% of the player score records 116, set the range of skill level values 106 associated with the medium award skill level 146 to include 15% of the player score records 116, and set the range of skill level values 106 associated with the high award skill level 148 to include 10% of the player score records 116.

In the illustrated embodiment, the gaming controller 12 is programmed to determine the award skill level 132 achieved by the player during the skill-based game sequence 86, and select the plurality of primary awards 130 based on the achieved award skill level 132. For example, during the award sequence 88, the gaming controller 12 may access RTP value data 152 (shown in FIG. 17) being stored in the memory device 80 and execute the RTP value data 152 to select an RTP value 154 based on the achieved award skill level 132. The gaming controller 12 may then accesses primary award data 156 (shown in FIG. 15) being stored in the memory device 80 and execute the primary award data 156 to select a set of primary awards 130 based on the selected RTP value 154.

Referring to FIG. 17, in one embodiment, the RTP value data 152 includes a plurality of RTP values 154. Each RTP value 154 is associated with a wager amount value 158 and an award skill level 132. Each RTP value 154 indicates an average award amount provided to players over time. During the award sequence 88, the gaming controller 12 accesses the RTP value data 152 and selects an RTP value 154 associated with the achieved award skill level 132 achieved by the player during the skill-based game sequence 86 and a wager amount bet by the player to initiate the skill-based game sequence 86. In one embodiment, the gaming controller 12 may use a separation between the selected RTP value and base RTP value which has been set on the gaming machine 10 as a deferment for prize pools for progressive prizes and/or leaderboard prizes mentioned in below. FIGS. 35-37 show example tables 160 of the base RTP values set on the gaming machine 10, deferment values and actual RTP values (the selected RTP values). And FIGS. 38-40 show example tables 186 of total deferment for 5000 sessions, total leader board increment for 5000 sessions and leaderboard accumulation for 5000 sessions. As shown in these tables, the deferment % of the wager is funded to the prize pool for leaderboard prizes. The prize pools may be funded by the deferment % of the wager and fixed % of the wager.

Figure 10:
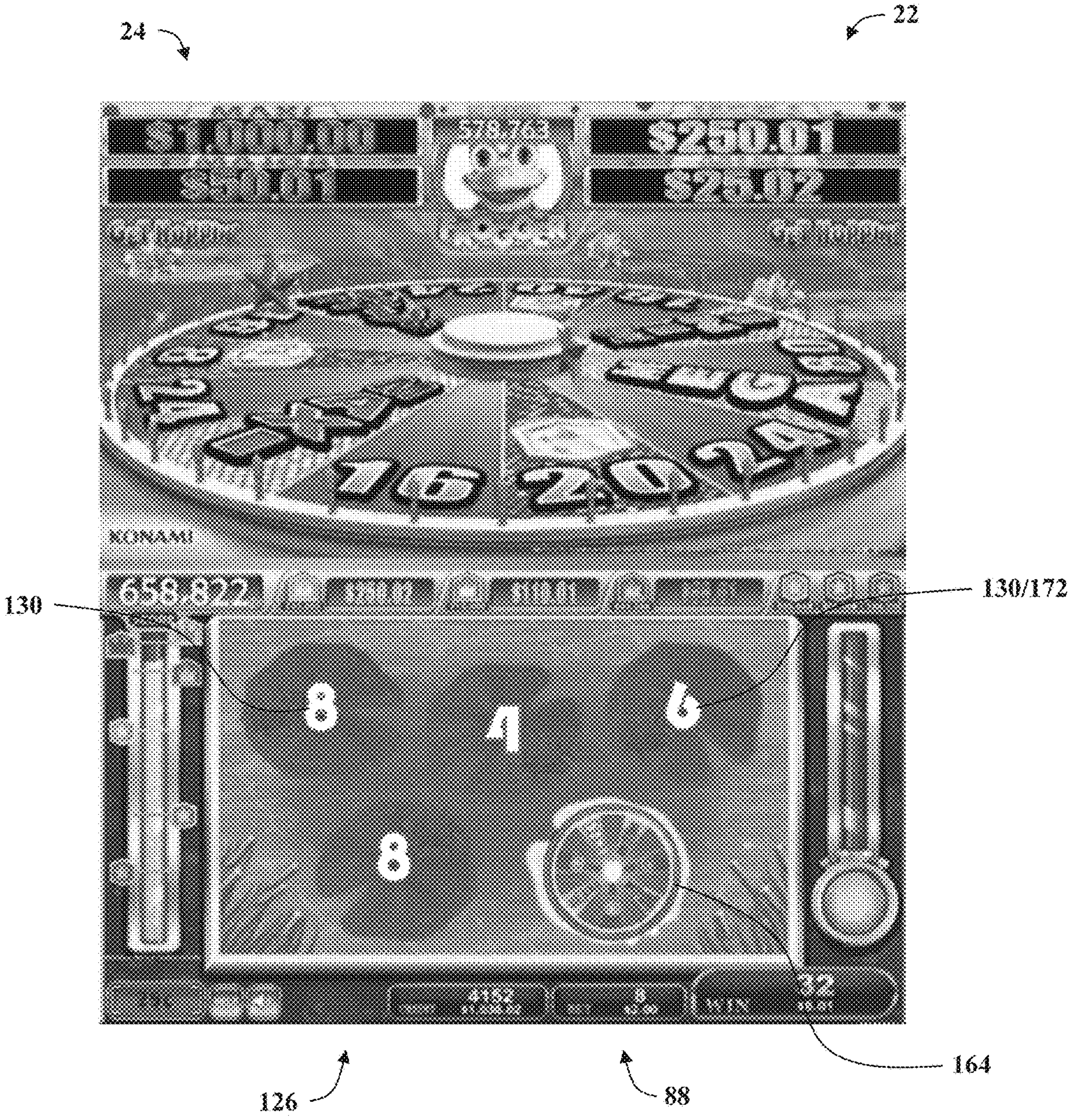

Referring to FIG. 15, in one embodiment, the primary award data 156 includes a plurality of primary award sets 162. Each primary award set 162 includes a plurality of primary awards 130 associated with a corresponding RTP value 154 and a corresponding wager amount value 158. During the award sequence 88, the gaming controller 12 may access the primary award data 156 and select a primary award set 162 that is associated with the determined RTP value 154 and the received wager amount. The gaming controller 12 then displays the primary award selection screen 126 (shown in FIGS. 9-10) to include the plurality of primary awards 130 included in the primary award set 162 associated with the determined RTP value and the received wager amount. Referring to FIGS. 9-10, upon displaying the primary award selection screen 126, the gaming controller 12 prompts the player to select one of the plurality of award selection images 128 associated with a plurality of primary awards 130. Upon receiving a signal indicated a player selected award selection image 128, the gaming controller 12 reveals the primary award selected by the player and adjusts the credit balance based on the player selected primary award. In one embodiment, as shown in FIG. 10 the gaming controller 12 may reveal each of the plurality of primary awards 130 included in the primary award set 162 associated with the determined RTP value and the received wager amount.

In the illustrated embodiment, the gaming controller 12 is configured to receive a signal indicating a wager amount being received from the player via the user input device 16 and initiate the skill-based game sequence 86 of the skill-based wagering game 22. The gaming controller 12 generates and displays the skill-based game sequence 86 including a plurality of skill events and receives player skill operations from the player via the user input device 16 in response to the displayed skill events. The gaming controller 12 then determines a player skill level value, e.g., a total skill point value, associated with the player based on the received player skill operations. Upon completion of the skill-based game sequence 86, the gaming controller 12 initiates the award sequence 88 and accesses the RTP value data 152 to determine an RTP value based on the determined player skill level value and the received wager amount. The gaming controller 12 then generates a plurality of primary awards 130 as a function of the determined RTP value and displays the primary award selection screen 126 on the display device 14 to select a primary award from the plurality of primary awards 130 in response to the player's operation. The gaming controller 12 then receives a signal from the user input device 16, determines a primary award selected from a plurality of primary awards 13, and adjusts the credit balance based on the player selected primary award. The primary award may be determined based on random number generated by the gaming controller 12. In one embodiment, the primary award screen may include selectable elements each associated with one of the plurality of primary awards and the primary award. In this case, the gaming controller 12 may allow player to select one of the selectable element and award the primary award associated with the selectable element selected by the player. Alternatively, the gaming controller 12 may select a primary award randomly irrespective of the player's selection.

In one embodiment, the gaming controller 12 accesses the RTP value data 152 and determines the RTP value associated with the award skill level having the associated range of skill level values that includes the player skill level value. The gaming controller 12 may also determine each range of skill level values include in the RTP value data 152 based on a plurality of player skill level values achieved in a predefined number of previous instances of the skill-based wagering game 22. In addition, the gaming controller 12 may be programmed to access the primary award data 156 that includes a plurality of primary award sets, with each primary award set including a plurality of primary awards associated with a corresponding RTP value and a corresponding wager amount value. The gaming controller 12 may access the primary award data 156 and determine a primary award set associated with the determined RTP value and the received wager amount and display the primary award selection screen 126 including the plurality of primary awards included in the primary award set associated with the determined RTP value and the received wager amount.

In one embodiment, the plurality of primary awards 130 may include a bonus feature award 164. The gaming controller 12 may be programmed to initiate a bonus feature event upon determining the bonus feature award is the selected primary award. In addition, the gaming controller 12 may be programmed to initiate the bonus feature event including accessing bonus award data 166 (shown in FIG. 20) being stored in the memory device 80 including a plurality of progressive awards 168 and a plurality of award probability sets 170. Each award probability set 170 includes a corresponding award skill level value 132 and a plurality of selection probabilities associated with each of the progressive awards. The gaming controller 12 may be programmed to determine an award probability set having a corresponding award skill level value matching the player skill level value and randomly selecting a progressive award based on the selection probabilities included in the determined award probability set and provide the selected progressive award to the player. In one embodiment, each award probability set includes a corresponding wager amount value 158. The gaming controller 12 may be programmed to determine the award probability set having a wager amount value matching the received wager amount.

Figure 11:
Figure 12:
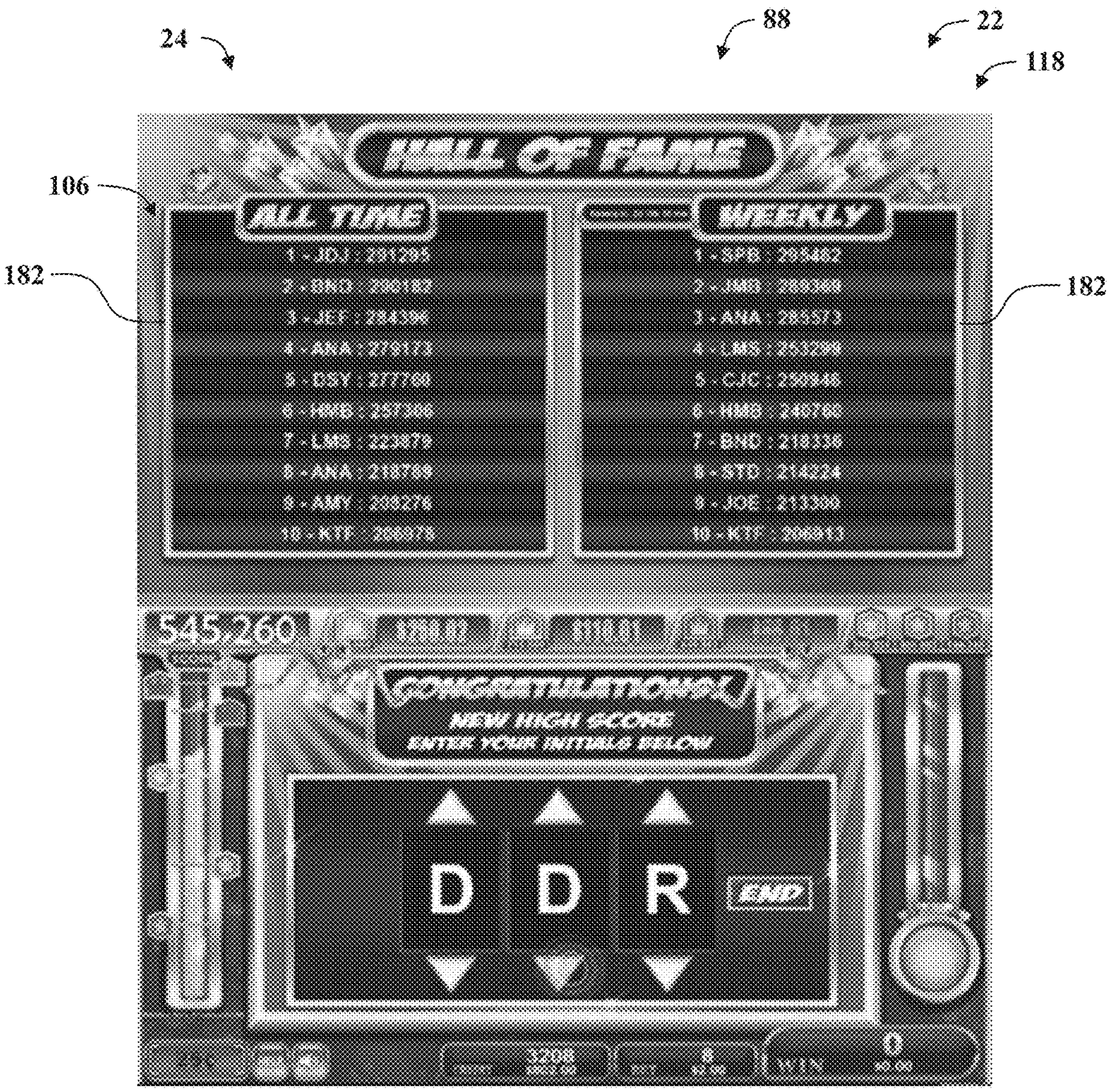
Figure 13:
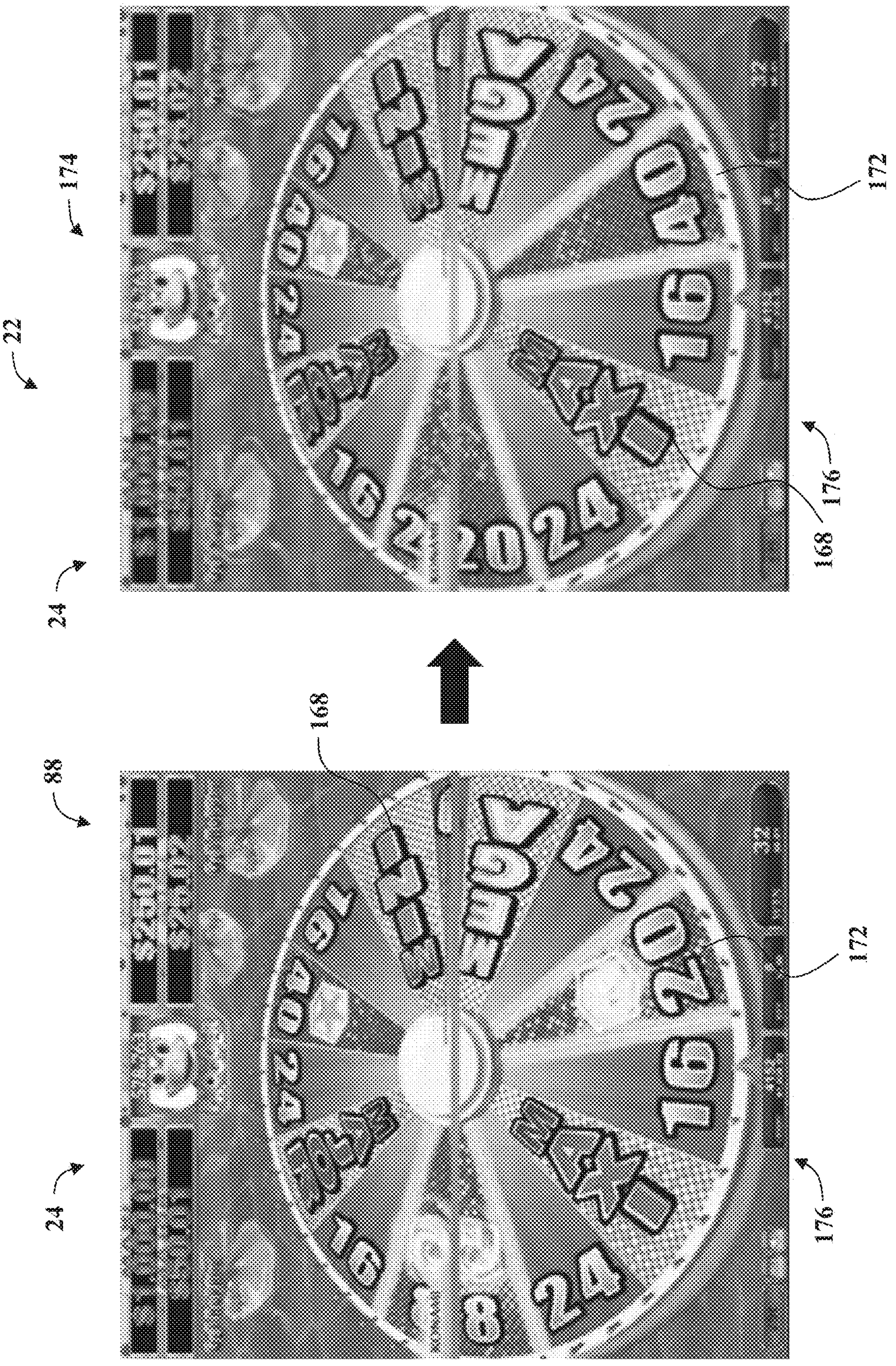
FIGS. 13-14 illustrate sequences of exemplary entertaining graphical displays of the skill-based wagering game that may be displayed on the gaming machine shown in FIGS. 1A-1B illustrating an upgraded bonus prize wheel, according to an embodiment of the present invention.
Figure 14:
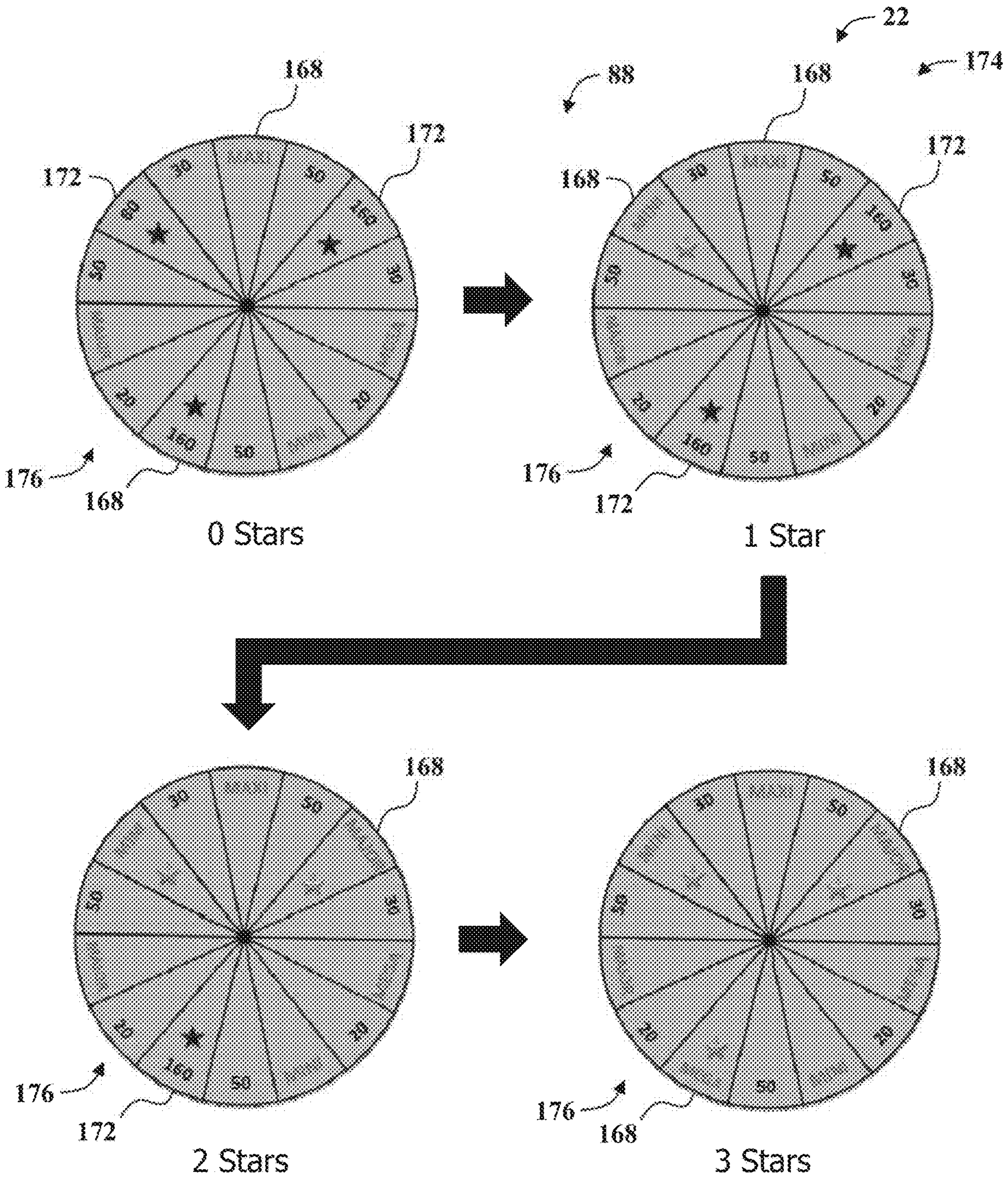

In the illustrated embodiment, the plurality of primary awards 130 may include a plurality of gaming credit awards 172 and/or a bonus feature award 164 that is associated with a bonus feature event 174 (shown in FIGS. 11 and 13-14). For example, in one embodiment, if the player selects a bonus feature award 164 from the primary award selection screen 126, the gaming controller 12 may initiate a bonus feature event 174 including a progressive prize wheel 176 that includes a plurality of progressive awards 168 that may be awarded to the player.

Referring to FIG. 15, in one embodiment, the primary award data 156 may include a set of primary awards 130 associated with each wager amount that may be received by the gaming machine 10 such that each player receives a primary award regardless of bet amount and/or achieved award skill level 132. In addition, a set of primary awards 130 may include a plurality of gaming credit amounts and/or one or more bonus feature awards 164. The bonus feature award 164 may be associated with a bonus feature event such as, for example, a wheel bonus chance 174 shown in FIGS. 11 and 13-14.

In one embodiment, the gaming controller 12 is programmed to adjust a probability of the bonus feature award 164 being provided to the player based on the achieve award skill level 132 achieved by the player during the skill-based game sequence 86. As shown in FIG. 15, the primary award data 156 may include sets of primary awards 130 that include one or more bonus feature awards 164, such that a higher wager amount place by the player to initiate the skill-based game sequence 86 increases the probability of a bonus feature award 164 being selected during the award sequence 88. For example, a set of primary awards 130 associated with a high wager amount, e.g., 20 game credits, includes more bonus feature awards 164 than the set of primary awards 130 associated with a medium wager amount, e.g., 8 gaming credits.

In the illustrated embodiment, during the award sequence 88, upon receiving a signal indicating a player's selection of a bonus feature award 164 via the primary award selection screen 126, the gaming controller 12 is programmed to initiate a bonus wheel chance feature 174. As shown in FIG. 11, during the bonus wheel chance feature 174, the gaming controller 12 displays an image of a rotatable prize wheel 176 including a plurality of bonus awards including a plurality of credit awards 172 and a plurality of progressives awards 168 (e.g., Mini, Major, Mega, and Maxi). Each progressive award 168 includes a different award value. In one embodiment, for example, the gaming controller 12 executes progressive contribution data 178 (shown in FIG. 24) to determine an amount of the award associated with each progressive award 168. In the illustrated embodiment, the gaming controller 12 obtains a random number and randomly selects one of the bonus awards being displayed on the prize wheel 176 and rotates and stops the prize wheel 176 to display the selected bonus award to the player. The gaming controller 12 then adjusts the credit balance associated with the player based on the randomly selected bonus award.

In one embodiment, the gaming controller 12 adjusts a selection probability associated with each progressive award 168 based on the award skill levels 132 achieved by the player during the skill-based game sequence 86 and/or a wager amount bet during the skill-based game sequence 86. Referring to FIG. 20, the gaming controller 12 may generate and store in the memory device 80 the bonus award data 166 including information associated with the progressive award selection probabilities associated with each progressive award 168. For example, the bonus award data 166 may include information indicating a set of progressive award selection probabilities associated with various combinations of award skill levels 132 and wager amounts 158. In one embodiment, upon initiating the bonus wheel chance feature 174, the gaming controller 12 may access the bonus award data 166 and select a progressive award selection probabilities associated with the progressive awards based on the wager amount received during the skill-based game sequence 86 and the award skill levels 132 achieved by the player during the skill-based game sequence 86. The gaming controller 12 then randomly selects the bonus award based on the selected set of progressive award selection probabilities. In one embodiment, the gaming controller 12 may generate and store in the memory device 80 progressive award data 180 (shown in FIGS. 25-29) that include information associated with progressive award strike values, e.g., jackpot hit frequencies, and progressive award deferment values. The gaming controller 12 may access the progressive award data 180 to generate the selection probabilities included in the bonus award data 166.

In one embodiment, as shown in FIG. 8, the gaming controller 12 may display the prize wheel 176 on the display device 14 during the skill-based game sequence 86. In addition, as shown in FIGS. 13-14 as the player achieves each award skill level 132, the gaming controller 12 may upgrade the credit awards 172 and/or increase a selection probability of one or more progressive awards 168. For example, as shown in FIG. 13, the gaming controller 12 may modify the prize wheel 176 to increase a credit award 172 based on the player achieving an increase award skill level 132, e.g., as the player obtains additional "Stars" based on the accumulated skill points. In addition, as shown in FIG. 14, the gaming controller 12 may modify the prize wheel 176 to illustrate an increased probability of receiving a progressive award by adding additional progressive awards to the prize wheel 176 as the player achieves increased award skill levels 132.

In one embodiment, the award module 124 includes a secondary award program, i.e., a leaderboard prize award program, that is configured to provide additional awards to player's achieving the highest total scores based on skill points obtained during the skill-based game sequence 86. For example, as shown on FIG. 12, upon completion of the skill-based game sequence 86, the gaming controller 12 may be programmed to compare the current total skill points achieved by the player against a ranked list of player scores to determine if the current player has achieved total score that is within a predefined range of ranked player scores 106. For example, in one embodiment, the gaming controller 12 may access the skill point data 114 to retrieve a predefined number of player score records 116 and generate a ranked list of the retrieved player score records 116 based on the corresponding total point score associated with each player score record 116 and the time stamp information included in the player score records 116. The gaming controller 12 may also generate and display a current ranked list of high scores 182 on the leaderboard screen 118 (shown in FIG. 12) based on the generated ranked list of the retrieved player score records 116. For example, the gaming controller 12 may be programmed to display a ranked list of the high scores achieved during a previous week, and/or display an all-time ranked list of high scores that have been achieved.

During game play, upon completion of the skill-based game sequence 86, the gaming controller 12 may compare the current player score achieved during the skill-based game sequence 86 against a current ranked list of high scores 182 displayed on the leaderboard screen 118. Upon determining that the current player score falls within the current ranked list of high scores 182, the gaming controller 12 prompts the player to enter player initials on the leaderboard screen 118, and records the player initials in the player score record and adjusts the ranked list of high scores 182 to display the player initials and corresponding player score.

In one embodiment, the gaming controller 12 may execute the secondary award program to determine whether to provide one or more secondary awards 184 (shown in FIG. 5), also referred to as leaderboard prize awards, to the player based on the total skill points achieved by the player during the skill-based game sequence 86.

The gaming controller 12 is configured to provide a secondary award to the player upon determining the player skill level value is greater than a secondary award skill level value associated with the secondary award 184. In one embodiment, the gaming controller 12 determines a ranked group of player skill values achieved in a predefined number of previous instances of the skill-based game and determines the secondary award skill level associated with a secondary award 184 to be equal to an average player skill level value of the ranked group of player skill level values. For example, the gaming controller 12 is programmed to generate and store leaderboard prize level data 186 (shown in FIG. 30-34) in the memory device 80. The leaderboard prize level data 186 is used by the gaming controller 12 to determine an amount of each secondary award 184 and to determine a current player score associated with each secondary award 184. Referring to FIGS. 5 and 31-34, in one embodiment, the gaming controller 12 generates a plurality of secondary awards 184 each having a larger award amount. For example, the gaming controller 12 may generate a first prize level award 188, e.g., a gold prize award, a second prize level award 190, e.g., a silver prize award, and a third prize level award 192, e.g., a bronze prize award. The first prize level award having a larger award value than the second prize level award 190 and the third prize level award 192, and the second prize level award 190 having a larger award value than the third prize level award 192.

As shown in FIG. 30, the gaming controller 12 may be programmed to associate a threshold value 194 with each secondary award 184. Each threshold value 194 may be associated with the total point score achieved during the skill-based game sequence 86. For example, the gaming controller 12 may generate a ranked list of total point scores using information included in the skill point data 114 and used the ranked list of total point scores to determine a threshold value 194 associated with each secondary award 184. For example, as shown in FIG. 31, the gaming controller 12 may generate threshold value 194 associated with the third prize level award 192 to be equal to a total point value that would fall within the top 3% of total point scores based on the ranked list of total point scores. Similarly, the gaming controller 12 may generate a threshold value 194 associated with the second prize level award 190 to be equal to a total point value that would fall within the top 2% of total point scores based on the ranked list of total point scores, and generate a threshold value 194 associated with the first prize level award 188 to be equal to a total point value that would fall within the top 1% of total point scores based on the ranked list of total point scores.

During the award sequence 88, the gaming controller 12 is configured to provide the secondary award 184 to the player upon determining the player skill level value is greater than a secondary award skill level value, i.e., a threshold value associated with a corresponding secondary award 184. For example, the gaming controller 12 may be programmed to determine the current player skill level value based on the total skill points achieved during the skill-based game sequence 86. The gaming controller 12 may then access the leaderboard prize level data 186 to select a secondary award 184 based on the current player skill level value, and provide the selected secondary award 184 to the player during the award sequence 88. In one embodiment, the gaming controller 12 may provide a plurality of secondary awards 184 to the player based on the current player skill level value, or may provide only one secondary award 184. For example, if the current player total skill points falls within the top 1% of total point scores based on the ranked list of total point scores, the gaming controller 12 may provide the player the first, second, and third prize award levels, or provide the player only the first prize award level.

Referring to FIG. 31, in one embodiment, the gaming controller 12 is programmed to determine an award amount associated with each secondary award 184 based on a total available award amount 196. In addition, the gaming controller 12 may assign predefined award percentages of the total available award amount 196 to each secondary award 184. For example, the gaming controller 12 may assign 70% of the total award amount to the first prize award level 188, assign 20% of the total available award amount 196 to the second prize award level 190, and assign 10% of the total available award amount 196 to the third prize award level 192.

In one embodiment, after providing a secondary award 184 to a player, the gaming controller 12 may adjust the award amounts associated with each secondary award 184 for use in subsequent game plays. For example, the gaming controller 12 may be programmed to reduce the total award amount available by the amount of the secondary award provided to the player, and adjust the amounts associated with each secondary award 184 based on the predefined award percentages. For example, as shown in FIGS. 33-34, if the first prize level award 188 (e.g., $441) is provided to the player during the award sequence 88, for the next instance of the skill-based wagering game 22, the gaming controller 12 reduces the total available award amount 196 (previously $630) by the award amount of the first prize level award 188 (e.g., $630−$441=$189) to determine a modified total award amount used in the next instance of the skill-based wagering game 22. The gaming controller 12 also adjusts the award amounts associated with each secondary award 184 based on the modified total award amount (e.g., $189), and the predefined award percentages. In addition, the gaming controller 12 may use the deferment and wager contribution information included in the leaderboard prize level data 186 shown in FIGS. 38-40 to adjust the total available award amount 196 during subsequent game play.

In one embodiment, the gaming controller 12 may generate and store in the memory device 80 award eligibility data 198 (shown in FIG. 16) that is used by the gaming controller 12 to determine the primary awards and/or secondary awards 184 available to the player based on the amount of gaming credits bet during the skill-based game sequence 86. For example, the gaming controller 12 may be programmed to access the information included in the award eligibility data 198 to adjust the number of bonus feature awards appearing in the primary award selection screen 126 based on the amount wagered in the skill-based wagering game 22. In one embodiment, a minimum wager amount may not be eligible for a bonus feature event 174 or a secondary award 184.

Figure 3:
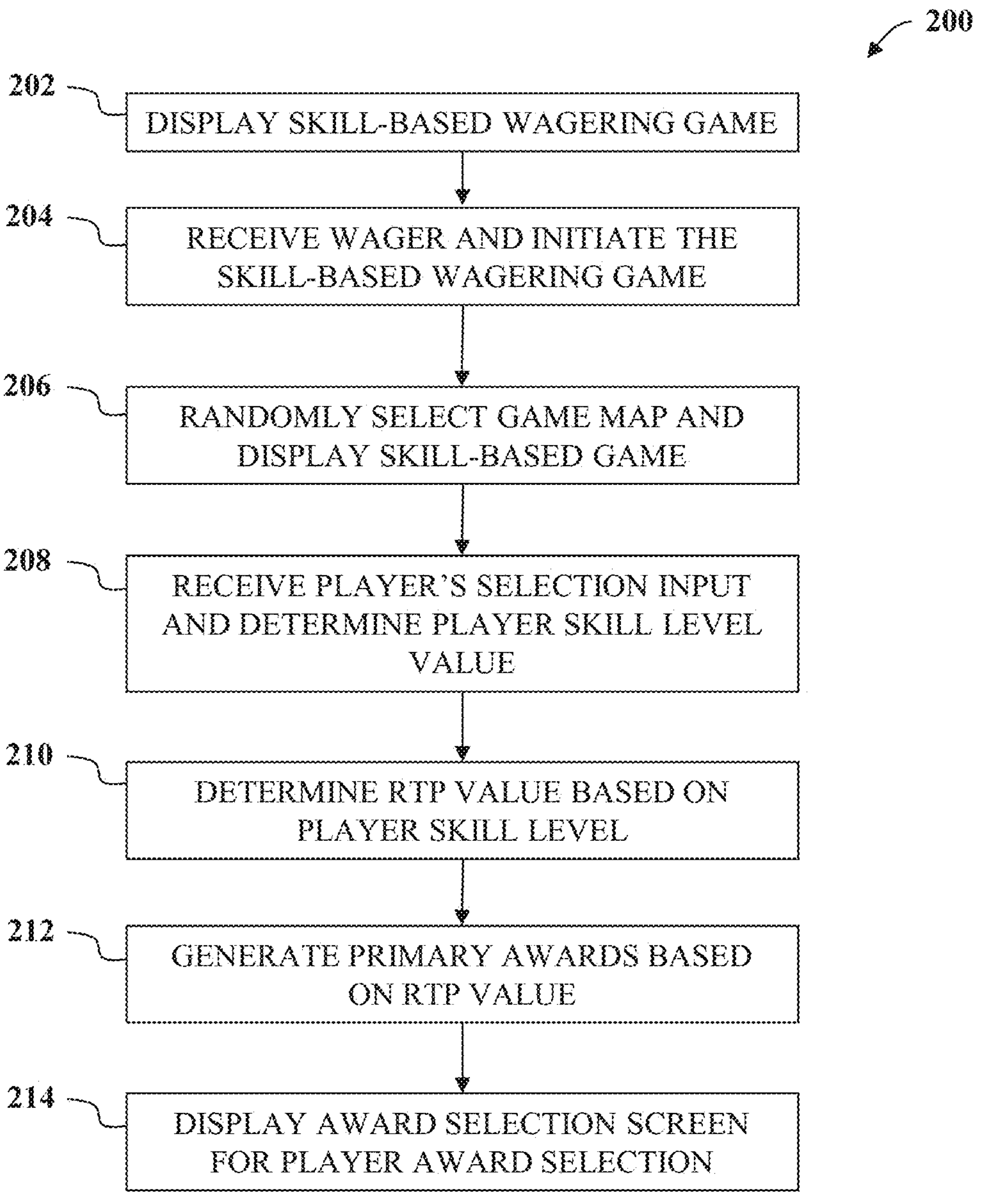
FIGS. 3-4 are flowcharts of methods that may be used with the gaming machine shown in FIGS. 1A-1B for providing a skill-based wagering game to a player, according to an embodiment of the present invention.
Figure 4:
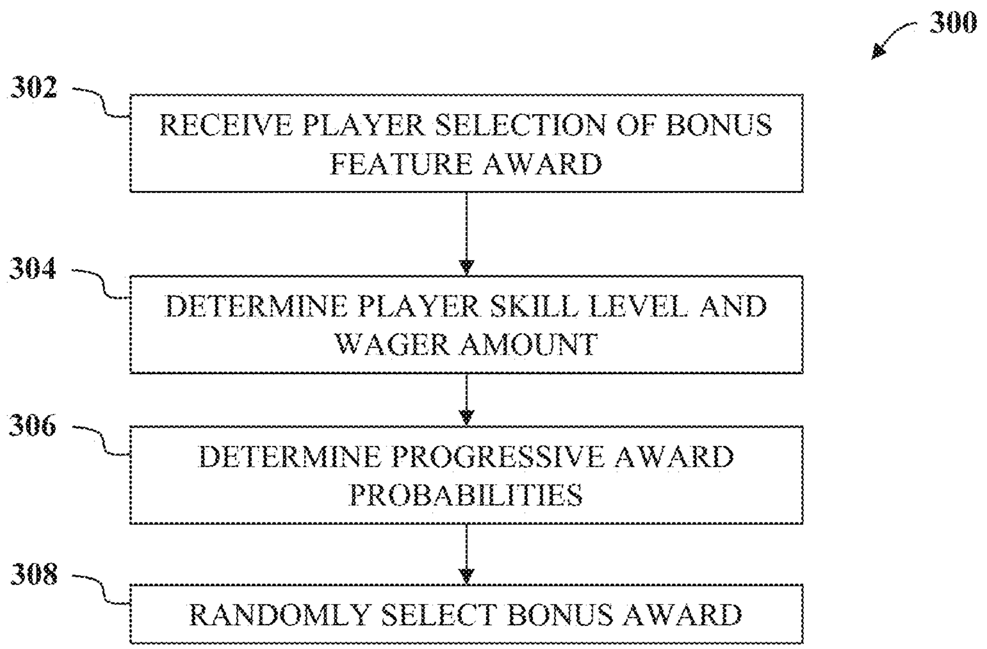

FIG. 3 is a flowchart of a method 200 that may be used to operate the gaming machine 10 to provide a skill-based wagering game to a player. FIG. 4 is another flowchart of an additional method 300 that may be used to operate the gaming machine 10 to provide skill-based wagering games to players. The methods 200 and 300 include a plurality of steps. Each method step may be performed independently of, or in combination with, other method steps. Portions of the methods may be performed by any one of, or any combination of, the components of the one or more gaming machines 10. FIGS. 5-14 are exemplary entertaining graphical displays of a skill-based wagering game that may be played with the gaming machine 10.

In the illustrated embodiment, in method step 202, the gaming controller 12 displays the skill-based wagering game 22 on the display device 14. In one embodiment, the gaming controller 12 displays the skill-based wagering game 22 (shown in FIG. 5) including a maze-type skill game that allows a player to navigate a game character through a series of obstacles displayed in a game map, such as, for example, Frogger™ published by Konami, Ltd.

In the illustrated embodiment, the gaming controller 12 displays the game map 52 and the game character 54 on the first display 26. The game map 52 includes a plurality of character positions 50 that may be occupied by the game character 54. The gaming controller 12 also displays a plurality of character position buttons 48 on the touch button unit 32 of the user input device 16. Each character position button 48 corresponds to a predefined character position 50 such that an activation of a character position button 48 by the player moves the game character 54 to the corresponding character position 50.

In method step 204, the gaming controller 12 receives a signal indicating a wager amount being received from the player via the user input device and initiates the skill-based game sequence 86 of the skill-based wagering game 22, and generates and displays the skill-based wagering game 22 including a plurality of skill events. For example, in the illustrated embodiment, the gaming controller 12 receives a signal from the user input device 16 indicating the player's actuation of a bet switch corresponding to a wager amount bet on the skill-based wagering game 22. Upon receiving a signal indicating the player's actuation of the bet switch, the gaming controller 12 initiates the skill-based game sequence 86.

In method step 206, the gaming controller 12 randomly selects or generates game map 52 and displays the skill-based game sequence 86 including the randomly selected game map 52 and the game character 54 on the first display 26. For example, upon initiating the skill-based game sequence 86, the gaming controller 12 is programmed to access the game map data 120, randomly select a game map data record 122 and execute the game map code to display the randomly selected game map 52 for use during the skill-based game sequence 86.

In method step 208, the gaming controller 12 receives player skill operations from the player via the user input device 16 in response to the displayed skill events and determines a player skill level value associated with the player based on the received player skill operations. For example, during the skill-based game sequence 86, the gaming controller 12 displays the game map 52 with a plurality of obstacles 98 and a plurality of bonus skill items 100 displayed within the plurality of character positions 50. The gaming controller 12 receives player operations of character position buttons and navigates the game character 54 through the game map 52 to character positions 50 corresponding to the player selected character position buttons.

In the illustrated embodiment, the gaming controller 12 assigns a point value to each player skill operations being made by the player during play of the skill-based wagering game 22. The gaming controller 12 also generates a total skill point score including the sum of the point values acquired by the player during an instance of the game. For example, during game play, the gaming controller 12 is configured to receive a player's operation of a character position button 48 corresponding to a character position 50 and determine a skill point value associated with the operated character position 50. The gaming controller 12 accumulates a running tally of point values acquired by the player through the sequence of player operations of character positions 50 to advance the game character 54 along the game map 52. The gaming controller 12 then determines a player skill level value based on the total skill point score achieved by the player during the skill-based game sequence 86.

In method step 210, the gaming controller 12 determines an RTP value based on the determined player skill level value and the received wager amount. For example, in one embodiment, the gaming controller 12 may access the skill level data 136 and select the award skill level associated with determined player skill level value. In one embodiment, each award skill level is associated with a different range of skill level values. The gaming controller 12 may be configured to determine the RTP value associated with the award skill level having the associated range of skill level values that includes the player skill level value. The gaming controller 12 may also be programmed to determine each range of skill level values based on a plurality of player skill level values achieved in a predefined number of previous instances of the skill-based wagering game. Upon selecting the award skill level associated with determined player skill level value, the gaming controller 12 may then access the RTP value data 152 (shown in FIG. 17) and an RTP value based on the selected award skill level and the wager amount bet by the player.

In method step 212, the gaming controller 12 generates a plurality of primary awards based on the selected RTP value. For example, the gaming controller 12 may access the primary award data 156 and select a primary award set associated with the determined RTP value 154 and/or the received wager amount.

In method step 214, the gaming controller 12 displays the primary award selection screen 126 including the selected a primary award set on the display device 14 to select a primary award from the plurality of primary awards included in the selected a primary award set. The gaming controller 12 then receives a signal from the user input device 16 to determine a selected primary award and adjust the credit balance based on the selected primary award.

Referring to FIG. 4, in one embodiment, the gaming controller 12 is configured to implement method 300 to provide a bonus feature award to the player. In the illustrated embodiment, in method step 302, during the award sequence 88 the gaming controller 12 may receive a player operation associated with a primary award that includes a bonus feature award. Upon detecting the selection of the bonus feature award, the gaming controller 12 initiates a bonus feature event such as, for example, the bonus wheel chance feature 174 including a plurality of a plurality of progressives awards (e.g., Mini, Major, Mega, and Maxi).

In method step 304, upon initiating the bonus feature event, the gaming controller 12 may access the skill level data 136 and select the award skill level associated with determined player skill level value achieved during the skill-based game sequence 86.

In method step 306, the gaming controller 12 determines a selection probability associated with each progressive award. For example, the gaming controller 12 may access the bonus award data 166 and select a progressive award selection probabilities associated with the progressive awards based on the wager amount received during the skill-based game sequence 86 and the award skill level achieved by the player during the skill-based game sequence 86.

In method step 308, the gaming controller 12 randomly selects a progressive award based on the selected progressive award selection probabilities and provides the award to the player. For example, in one embodiment, the gaming controller 12 may display the bonus wheel chance feature 174 including the prize wheel 176. The gaming controller 12 obtains a random number and randomly selects one of the bonus awards being displayed on the prize wheel 176 and rotates and stops the prize wheel 176 to display the selected bonus award to the player. The gaming controller 12 then adjusts the credit balance associated with the player based on the randomly selected bonus award.

In one embodiment, the gaming controller 12 may be programmed to access the progressive award data being stored in the memory device including a plurality of progressive awards and a plurality of award probability sets. Each award probability set including a corresponding award skill level value and a plurality of selection probabilities associated with each of the progressive awards. The gaming controller 12 determines an award probability set having a corresponding award skill level value matching the player skill level value and randomly selects a progressive award based on the selection probabilities included in the determined award probability set and provide the selected progressive award to the player. In one embodiment, each award probability set includes a corresponding wager amount value. The gaming controller 12 is configured to determine the award probability set having a wager amount value matching the received wager amount.

A typical bought skill-based game as described herein will last 15 seconds. A minimum bet: $1 may be required with 3 Bet options: ($1, $2, $5). The gaming machine 10 may support betting denominations of 25¢ with a reduced minimum bet credit size. ($1=100 credits at 10 denomination). During the skill-based wagering game, a player taps one of the 5 buttons to advance the frog one space upward. (Note map scrolls down). The player must avoid hazards like river tiles, vehicles and crocodiles. All objects are stationary. Player loses time (~1 sec) when the character collides with a hazard or touches a river tile. A safe move will play a musical note as a reward.

Game Difficulty: The game map advances only as fast as you touch the buttons. The further the player travels the more difficult the map becomes (More obstacles and even dynamic ones). Crocodile and snake hazards are introduced. Randomly generated maps are used which help increase game longevity.

Scoring data (see FIG. 22) is used to determine player scores to provide a tangible measure of each player's performance. The player score may be used in awarding high score bonuses, e.g., secondary awards, and/or upgrading a prize wheel.

Pick Game: prize selection pick game is awarded after each skill game to resolve wager. "Pseudo Skill"—unselected items revealed. Awards 0.25×-1.0× bet or Wheel Bonus. Allows Wheel Bonus to be better balanced and always pay >=1× bet (No Blanks).

Wheel Bonus: Trigger Cycle: 1/5 games ($2 bet); 2/5 games ($5 bet). 14 Segment Wheel with various credit and 4 linked progressive jackpots. Wheel is upgraded as player score increases: Up to 3 upgrades (Shown visually as stars); Each upgrade changes 1 credit prize to progressive jackpot wedge; More stars=Greater RTP %.

Wheel Jackpot Math: Attractive jackpot values for gamble style player (shown in FIG. 24). Wheel Jackpot Cycles: Increased bet and or skill increases chance at winning a jackpot (shown in FIG. 25).

Leader Boards: Motivates players to continue to play to beat their best score and see how they rank; Provides a sense of achievement; Top 100 all time and weekly scores are saved and displayed on top screen and signage; and Player can input their name if they achieve a top score (60 second time limit).

High Score Bonus: Provides financial motivation to achieve high scores; Scores to beat calculated based on last 5000 recorded scores of the entire bank; and Multiple prize pools will be kept for each level (shown in FIG. 30).

High Score Bonus Funding: Fixed Increment (~1.45%); Deferment—Difference in RTP % between lesser skilled and most skilled max bet player; Operator can also initially seed so start up values are not zero; 50% of Deferment and Fixed Increment will be used to pay off this startup seed.

High Score Bonus System: Leaderboards will not need to be reset to regulate prize difficulty. Player collusion potential is reduced because the pool of scores used to determine the thresholds is large, and is not transparent to the player.

High Score Bonus System—Prize Range: Assumes 5000 games played at $2 bet; A High Score Prize will be awarded every 600 games on average.

Math Sketch: Base RTP % increases when more stars are earned or when player bets more; Deferment RTP % decreases when more stars are earned or when player bets more; Actual Machine RTP %=Base RTP %+Deferment %+Increment %.

Progressives: Although increment is fixed across all bet levels, then probability of being awarded a particular progressive is affected by bet level and skill level. The probability always increases with both of these factors, but not in a linear pattern. The following provides give an overview of cycles and strike values for the progressives with the assumptions that for each case all games are played at the same bet level and with the same skill based star accumulation.

This model assumes a denomination of $0.25. The progressive reset values and increment information for the progressives and leaderboards is as shown in FIG. 24. The overall Jackpot Cycles for each combination of Bet and Stars (skill factor) are as shown in FIG. 25.

Strike values for all progressives will vary depending on the distribution of bet levels played over time by players. In particular, players playing below the minimum eligible bet for each jackpot contribute increment without increasing the hit cycles. The tables shown in FIGS. 26-29 illustrate the cycles and strike values for each progressive level based on continued play at a specific bet level and a specific number of accumulated stars. Actual values in the field will be bounded by the extreme values for any population considered.

Leaderboard Prizes: Leaderboards will be a powerful tool to motivate prolonged gameplay and reward player skill and development.

"All Time" leaderboards and short term ("Weekly" or "Recent") leaderboards should rotate in display on a shared bank monitor. This motivates players to achieve a high score to see their name on the leaderboard, the same way that players were motivated with the original arcade game.

From the leaderboard tracking we will also have prizes for players based on achieving a high score on a particular level. Rather than have that score be directly linked to the leaderboard, the most recent 5000 scores will be used to calculate point thresholds that the player must beat to earn the skill prizes. On machine reset, a pre-populated set of scores can be included in the software to ensure that the difficulty of prizes is not too easy right away.

Calculating dynamic thresholds gives flexibility that using the literal leaderboard does not: 1) Leaderboards will not need to be reset to regulate prize difficulty. This gives players long term satisfaction and "bragging rights" for having their score posted on the leaderboard, and eliminates the risk of player disputes arising from an easy high score prize right after a reset. 2) Player collusion potential is reduced because the pool of scores used to determine the thresholds is large, and is not transparent to the player. 3) The gaming machine can display target values to the player during play instead of referring them to a leaderboard, allowing more flexibility in leaderboard display choreography.

Threshold Calculation: Based on the pre-populated scores and/or the most recent 5000 scores the thresholds for score prizes can follow the distribution shown in FIG. 30. The top threshold is calculated by averaging the top 1% of all scores in the pool. The second threshold is the average of the top 2% of all scores, and the third threshold the top 3%. Because the average is used, the top threshold should be near to the lowest score in the top 0.05% of all scores. The effective probabilities above make this assumption across all thresholds, and do not include scores that would lie above a higher threshold.

RTP Deferment: This method is used to take the difference in RTP caused by player skill and repurpose it to increase the size of the prize pools.

The Star system allows players in increase their RTP through skill so long as they are betting at a level eligible for the wheel bonus. The gaming controller will make the point thresholds for the Stars earned dynamic based off of the same pool of points used to determine the leaderboard prize thresholds. In this way, the gaming controller guarantees a range of stars earned across the player base. For players who earn less Stars and play at a lower effective RTP, we use the difference in the theoretical RTP of the level earned and the best possible RTP and increment based on this amount. An example of the distribution of Stars awarded is shown in FIG. 19. With the RTP for each bet level and Star level the gaming controller can determine the deferment that would occur for players earning less than 3 stars, as shown in FIGS. 35 and 36. Notice that the deferment for a player betting 4 is lower than it could be. Casino operators may be more open to the 4 credit "training mode" bet if the return is lower for those players. However, the deferment for this level could be increased by up to an additional 2.5%. With the deferment and the 2% increment from above, the actual reported RTP may be as illustrated in FIG. 37. This also simplifies RTP reporting and understanding. Instead of having wide ranges of RTP based on bet level and skill, the machine RTP is constant for the 4 credits bet and for 8+ credits bet. The gaming machine is able to take advantage of the difference in effective RTP and give players of high skill a larger effective RTP. Since operators are going to consider the RTP for maximal skill having that same RTP across the board should not discourage them.

Accumulation Rate: If 5000 sessions are played at a particular bet level the total deferment is as shown in FIG. 38. In addition to deferment there is a fixed increment rate associated with the Leaderboard Prizes that is constant regardless of bet or stars. The total increment added to the leaderboard for each bet level over 5000 sessions played is shown in FIG. 39, which takes into consideration the Star distribution that have controlled above. The actual total for the 5000 sessions at a particular bet level is the sum of both tables across the row corresponding to that bet level. The total accumulation for the 5000 sessions and the accumulation per level is shown in FIG. 40. Since a bet of 4 credits is not eligible for leaderboard prizes, the accumulation gained is in addition to what is considered in the calculated strike prices and prize frequencies.

Prize Pool Seeding: The gaming machine provides the operator the option to seed their prize pools when placing the machines so that the leaderboard prize pools do not start empty. For example, if an operator seeds the bank with $500 for the leaderboard prizes, the prizes offered could start off with the following seeding shown in FIG. 32. In the game software the total deferment and increment assigned to the leaderboard prizes can be portioned until the seed value is paid off. 50% of accumulation would still go to the leaderboard prizes for growth, and 50% would pay off a portion of the seed. Once the seed value has been earned 100% of accumulation will go into the prize pools.

Prize Pools: The gaming controller 12 may implement two major methods that can be used for Prize Pooling: Shared and Independent. In a shared pool, all increment and deferment that accumulates would be in one large pool. The prizes displayed to the player would be portions of this pool. If any of the prizes are awarded the size of the pool is reduced, and thus the sizes of the other prizes are also reduced. In independent pools a portion of all increment and deferment would be assigned to each prize pool. If a prize is awarded only that prize's pool is affected, and the other prizes do not change. For example, 5000 sessions on average will award one $1^{st}$ Prize, three $2^{nd}$ Prizes and six $3^{rd}$ Prizes on average. The accumulation tables shown in FIGS. 38-40 illustrate how much accumulation may occur in this time, but generally there should be more accumulation than this due to player bet choices. Players who play the 4 credit "training mode" accumulate to all pools without having a chance to win them.

Leaderboard Prize Payout Structure—Shared Prize Pools: The advantaged of a shared prize pool is that nothing ever resets completely to 0. Only a portion of the pool is ever one, and the remaining pool is redistributed over all prizes. The disadvantage of a shared prize pool is that the top prize can be repeatedly reduced in size from players winning lower prizes. When initiating a level the player will be able to see the point thresholds and prizes for that particular level, as shown in FIG. 31. After winning a prize, the pool is redistributed. The above uses a 70%/20%/10% distribution. Referring to FIG. 31, if Prize 3 of $70.00 is won, the resolved pool would distribute to the distribution shown in FIG. 33. Then if Prize 1 of $441.00 is won, and the resolved pool will be the distribution shown in FIG. 34. Dynamically spreading the pool among all prizes will lower the pool across the board when a prize is hit, but also makes it takes several hits in a short period of time to clear the pool.

Leaderboard Prize Payout Structure—Independent Prize Pools: in an independent prize pool structure all increment and deferment is assigned to a prize when it accumulates. That prize pool is maintained independently, and can only be reduced if the respective prize is awarded. There are two ways to handle accumulation and payout. The first is to directly accumulate and fully pay out, the second is to split accumulation to future prizes. Take the following example of both methods where the average amount of accumulation for prize 1 between awards is $500:

1) All accumulation is paid out. If $500 is accumulated in prize 1, the next player who wins prize 1 received all $500 and the prize resets to 0. Starting with the first prize the average prize is $500 and the reset amount is always $0.

2) Accumulation is split to future prizes. If $500 is accumulated, it is split up over the next 5 prizes. The first player to hit the prize receives $100. By the next time the prize is awarded another $500 has been accumulated and split over the next 5 prizes. The second player to hit the prize receives $200. Likewise, the third player receives $300, the fourth player $400 and the fifth player and all future players receive $500. This method takes some time to ramp up, but from the fifth player onward the average prize is $500 and the average reset amount is $400.

The advantage of (1) is that the early prize winners get the full accumulation, but the disadvantage of a $0 reset will motivate players to stop playing once the prize has been hit. The disadvantage of (2) is that the prizes take some time to ramp up, but once they are hit the players are not motivated to leave the machine. The ramp up is not horrible for a new machine either, since it will take some time to establish a representative leaderboard for the player base. If the leaderboard thresholds are too high or too low on ramclear the scores will need time to normalize. During normalization the prizes may be hit very frequently or very rarely. The slow ramp up can also be somewhat remedied with seeding the prizes if the operator chooses to do so. The seeds are paid off slowly during the ramp up period. The prizes are appealing at ramclear to attract players, and they never go to 0.

Exemplary embodiments of a gaming machine, a gaming system, and a method of providing an award to a player are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for displaying a computer-animated game to a player, comprising:

a gaming cabinet;

a display device mounted on the gaming cabinet and including a primary graphical user interface (GUI) display screen displaying computer-generated images thereon;

a user input device mounted to the gaming cabinet and including a touch button unit configured to display a touchscreen GUI displaying computer-generated images thereon for receiving player selections; and a controller coupled to the display device and the user input device, the controller including:

a random number generator generating random numbers;

a memory device storing computer-executable instructions including game map data, return to player (RTP) value data, and primary award data, the game map data including information associated with various game maps and map selection probabilities associated with each game map, the RTP value data including a plurality of RTP values with each RTP value indicating an average award amount provided to players over time and an award skill level, the primary award data including a plurality of primary award sets with each primary award set including a plurality of primary awards associated with a corresponding RTP value; and at least one processor programmed to execute an algorithm to display an animated sequence of computer-generated images on the primary GUI of the display device and the touchscreen GUI including the steps of:

accessing the game map data from the memory device and randomly selecting a game map from the game map data based on the map selection probabilities using the random number generator;

rendering a game screen on the primary GUI of the display device including the randomly selected game map including a grid including a plurality of cells arranged in five columns and five rows, a least one row including five character positions with each character position associated with a corresponding column, and a game character movable within the five character positions;

rendering a plurality of character position touch buttons associated with the five character positions on the touchscreen GUI of the touch button display;

animating a skill-based game on the primary GUI of the display device by:

initiating a countdown of a predefined period of time and rendering a time counter image including a graphic bar on the game screen which decreases in height corresponding to the countdown of the predefined period of time;

receiving player skill operations from the player via the touchscreen GUI of the touch button unit including player selections of the character position touch buttons and responsively animating the game character to move to corresponding character positions associated with the player selected character position touch buttons;

animating the randomly selected game map to move downward through the grid in response to each selection of a character position touch button;

awarding a skill point during the animated skill-based game for each occurrence of the game character being moved to corresponding character positions associated with the player selected character position touch buttons, and animating an image of a point scale including a graphic point bar on the game screen that increases in height as the awarded skill points are accumulated;

determining a total number of skill points associated with the player skill operations accumulated during the countdown of the predefined period of time and determining a player skill level value associated with the determined total number of skill points;

accessing the RTP value data and determining an RTP value based on the determined player skill level value;

accessing the primary award data and selecting a primary award set associated with the determined RTP value; and rendering a primary award selection screen on the primary GUI of the display device including a plurality of player selectable primary award icons, each icon associated with one of a plurality of primary awards included in the primary award set.

2. The gaming machine claim 1, wherein the display device includes a touchscreen, the at least one processor is programmed to execute the algorithm including the steps of:

receiving a player selection of one of the displayed player selectable primary award icons via the touchscreen; and transforming the selected one of the displayed player selectable primary award icons to display a corresponding primary award image.

3. The gaming machine claim 1, wherein the at least one processor is programmed to execute the algorithm including the steps of:

displaying images of a plurality of award skill levels along the point scale, each award skill level indicating a corresponding number of skill points.

4. The gaming machine claim 3, wherein the at least one processor is programmed to execute the algorithm including the steps of:

determining a corresponding award skill level achieved by the player during the game based on the determined total number of skill points; and determining the RTP value based on the corresponding award skill value.

5. The gaming machine claim 1, wherein the at least one processor is programmed to execute the algorithm including the steps of:

rendering five character position touch buttons on the touchscreen GUI of the touch button display.

6. A method of operating a gaming machine for displaying a computer-animated game to a player including a gaming cabinet, a display device mounted on the gaming cabinet and including a primary graphical user interface (GUI) display screen displaying computer-generated images thereon, a user input device mounted to the gaming cabinet and including a touch button unit configured to display a touchscreen GUI displaying computer-generated images thereon for receiving player selections, and at least one processor operably coupled to the display device and the user input device, the method including the at least one processor performing an algorithm to display an animated sequence of computer-generated images on the primary GUI of the display device and the touchscreen GUI including the steps of:

accessing a memory device storing computer-executable instructions including game map data, return to player (RTP) value data, and primary award data, the game map data including information associated with various game maps and map selection probabilities associated with each game map, the RTP value data including a plurality of RTP values with each RTP value indicating an average award amount provided to players over time and an award skill level, the primary award data including a plurality of primary award sets with each primary award set including a plurality of primary awards associated with a corresponding RTP value;

accessing the game map data from the memory device and randomly selecting a game map from the game map data based on the map selection probabilities using a random number generator;

rendering a game screen on the primary GUI of the display device including the randomly selected game map including a grid including a plurality of cells arranged in five columns and five rows, a least one row including a five character positions with each character position associated with a corresponding column, and a game character movable within the five character positions;

rendering a plurality of character position touch buttons associated with the five character positions on the touchscreen GUI of the touch button display;

animating a skill-based game on the primary GUI of the display device by:

initiating a countdown of a predefined period of time and rendering a time counter image including a graphic bar on the game screen which decreases in height corresponding to the countdown of the predefined period of time;

receiving player skill operations from the player via the touchscreen GUI of the touch button unit including player selections of the character position touch buttons and responsively animating the game character to move to corresponding character positions associated with the player selected character position touch buttons;

animating the randomly selected game map to move downward through the grid in response to each selection of a character position touch button;

awarding a skill point during the animated skill-based game for each occurrence of the game character being moved to corresponding character positions associated with the player selected character position touch buttons, and animating an image of a point scale including a graphic point bar on the game screen that increases in height as the awarded skill points are accumulated;

determining a total number of skill points associated with the player skill operations accumulated during the countdown of the predefined period of time and determining a player skill level value associated with the determined total number of skill points;

accessing the RTP value data and determining an RTP value based on the determined player skill level value;

accessing the primary award data and selecting a primary award set associated with the determined RTP value; and rendering a primary award selection screen on the primary GUI of the display device including a plurality of player selectable primary award icons, each icon associated with one of a plurality of primary awards included in the primary award set.

7. The method of claim 6, including the at least one processor performing the algorithm including the steps of:

receiving a player selection of one of the displayed player selectable primary award icons via a touchscreen of the display device; and transforming the selected one of the displayed player selectable primary award icons to display a corresponding primary award image.

8. The method of claim 6, including the at least one processor performing the algorithm including the steps of:

displaying images of a plurality of award skill levels along the point scale, each award skill level indicating a corresponding number of skill points.

9. The method of claim 8, including the at least one processor performing the algorithm including the steps of:

determining a corresponding award skill level achieved by the player during the game based on the determined total number of skill points; and determining the RTP value based on the corresponding award skill value.

10. The method of claim 6, including the at least one processor performing the algorithm including the steps of:

rendering five character position touch buttons on the touchscreen GUI of the touch button display.

11. A non-transitory computer-readable storage media having computer-executable instructions embodied thereon to operate a gaming machine for displaying a computer-animated game to a player including a gaming cabinet, a display device mounted on the gaming cabinet and including a primary graphical user interface (GUI) display screen displaying computer-generated images thereon, a user input device mounted to the gaming cabinet and including a touch button unit configured to display a touchscreen GUI displaying computer-generated images thereon for receiving player selections, and at least one processor operably coupled to the display device and the user input device, when executed by the at least one processor the computer-executable instructions cause the processor to perform an algorithm to display an animated sequence of computer-generated images on the primary GUI of the display device and the touchscreen GUI including the steps of:

accessing a memory device storing computer-executable instructions including game map data, return to player (RTP) value data, and primary award data, the game map data including information associated with various game maps and map selection probabilities associated with each game map, the RTP value data including a plurality of RTP values with each RTP value indicating an average award amount provided to players over time and an award skill level, the primary award data including a plurality of primary award sets with each primary award set including a plurality of primary awards associated with a corresponding RTP value;

accessing the game map data from the memory device and randomly selecting a game map from the game map data based on the map selection probabilities using a random number generator;

rendering a game screen on the primary GUI of the display device including the randomly selected game map including a grid including a plurality of cells arranged in five columns and five rows, a least one row including five character positions with each character position associated with a corresponding column, and a game character movable within the five character positions;

rendering a plurality of character position touch buttons associated with the five character positions on the touchscreen GUI of the touch button display;

animating a skill-based game on the primary GUI of the display device by:

initiating a countdown of a predefined period of time and rendering a time counter image including a graphic bar on the game screen which decreases in height corresponding to the countdown of the predefined period of time;

receiving player skill operations from the player via the touchscreen GUI of the touch button unit including player selections of the character position touch buttons and responsively animating the game character to move to corresponding character positions associated with the player selected character position touch buttons;

animating the randomly selected game map to move downward through the grid in response to each selection of a character position touch button;

awarding a skill point during the animated skill-based game for each occurrence of the game character being moved to corresponding character positions associated with the player selected character position touch buttons, and animating an image of a point scale including a graphic point bar on the game screen that increases in height as the awarded skill points are accumulated;

determining a total number of skill points associated with the player skill operations accumulated during the countdown of the predefined period of time and determining a player skill level value associated with the determined total number of skill points;

accessing the RTP value data and determining an RTP value based on the determined player skill level value;

accessing the primary award data and selecting a primary award set associated with the determined RTP value; and rendering a primary award selection screen on the primary GUI of the display device including a plurality of player selectable primary award icons, each icon associated with one of a plurality of primary awards included in the primary award set.

12. The non-transitory computer-readable storage media of claim 11, wherein the computer-executable instructions cause the at least one processor to perform the algorithm including the steps of:

receiving a player selection of one of the displayed player selectable primary award icons via a touchscreen of the display device; and transforming the selected one of the displayed player selectable primary award icons to display a corresponding primary award image.

13. The non-transitory computer-readable storage media of claim 11, wherein the computer-executable instructions cause the at least one processor to perform the algorithm including the steps of:

displaying images of a plurality of award skill levels along the point scale, each award skill level indicating a corresponding number of skill points.

14. The non-transitory computer-readable storage media of claim 13, wherein the computer-executable instructions cause the at least one processor to perform the algorithm including the steps of:

determining a corresponding award skill level achieved by the player during the game based on the determined total number of skill points; and determining the RTP value based on the corresponding award skill value.

15. The non-transitory computer-readable storage media of claim 11, wherein the computer-executable instructions cause the at least one processor to perform the algorithm including the steps of:

rendering five character position touch buttons on the touchscreen GUI of the touch button display.

* * * * *